US012181078B2

(12) United States Patent
Schjerpen et al.

(10) Patent No.: US 12,181,078 B2
(45) Date of Patent: Dec. 31, 2024

(54) SUBSEA PIPELINE WITH MULTIPLE ACCESS NODES

(71) Applicant: FMC Technologies, Inc., Houston, TX (US)

(72) Inventors: Aksel M. Schjerpen, Fornebu (NO); Robert A. Perry, Katy, TX (US); Thomas L. Hergarden, Spring, TX (US)

(73) Assignee: FMC Technologies, Inc., Houston, TX (US)

( * ) Notice: Subject to any disclaimer, the term of this patent is extended or adjusted under 35 U.S.C. 154(b) by 1096 days.

(21) Appl. No.: 16/976,364

(22) PCT Filed: Mar. 2, 2018

(86) PCT No.: PCT/US2018/020587
§ 371 (c)(1),
(2) Date: Aug. 27, 2020

(87) PCT Pub. No.: WO2019/168539
PCT Pub. Date: Sep. 6, 2019

(65) Prior Publication Data
US 2021/0164588 A1    Jun. 3, 2021

(51) Int. Cl.
*F16L 1/26*      (2006.01)
*F16L 1/20*      (2006.01)
*F16L 41/06*     (2006.01)

(52) U.S. Cl.
CPC .................. *F16L 1/26* (2013.01); *F16L 1/207* (2013.01); *F16L 41/06* (2013.01)

(58) Field of Classification Search
CPC .............. F16L 1/26; F16L 1/207; F16L 41/06
(Continued)

(56) References Cited

U.S. PATENT DOCUMENTS 3,756,287 A * 9/1973 Bishop .................. F16L 45/00
                                                    138/92
5,351,718 A * 10/1994 Barton .................. B65D 90/10
                                                    138/92
(Continued)

FOREIGN PATENT DOCUMENTS

WO     03/085306 A1    10/2003

OTHER PUBLICATIONS

International Search Report and Written Opinion dated Jan. 17, 2019 for PCT/US2018/020587.
(Continued)

*Primary Examiner* — David R Deal
(74) *Attorney, Agent, or Firm* — Osha Bergman Watanabe & Burton LLP

(57) ABSTRACT

A system disclosed herein comprises a pipeline and a plurality of access node structures axially spaced apart from one another along the pipeline, wherein each of the plurality of access node structures comprises a substantially planar upper surface. Also disclosed is a method for deploying a pipeline that comprises a plurality of future access node structures, wherein, at the time the pipeline is deployed subsea, the future access node structures prevent access to an interior of the pipeline, and wherein the plurality of access node structures comprises at least one of a tapping structure, a pressure-barrier retaining structure that is adapted to receive a pressure-barrier device and a pressure-barrier retaining structure comprised of a recess with a scored pressure-retaining bottom.

20 Claims, 26 Drawing Sheets

(58) Field of Classification Search
USPC .......................................................... 138/92
See application file for complete search history.

(56) References Cited

U.S. PATENT DOCUMENTS

| | | | | |
|---|---|---|---|---|
| 6,004,072 | A | 12/1999 | Cunningham | |
| 6,884,373 | B1* | 4/2005 | Johnson | F16L 41/06 264/36.16 |
| 10,041,630 | B1* | 8/2018 | Huddleston | E03B 7/003 |
| 2004/0037648 | A1* | 2/2004 | Kiest, Jr. | F16L 41/12 405/154.1 |
| 2004/0089342 | A1 | 5/2004 | Vennemann et al. | |
| 2004/0237277 | A1* | 12/2004 | Gregory | F16L 41/06 29/458 |
| 2006/0027627 | A1* | 2/2006 | Garrison | F16L 41/06 228/101 |
| 2010/0018693 | A1* | 1/2010 | Duncan | E21B 37/00 166/384 |
| 2010/0059987 | A1* | 3/2010 | Avery | F16L 41/06 285/104 |
| 2010/0212754 | A1* | 8/2010 | Ayers | F16L 1/26 137/318 |
| 2011/0259589 | A1* | 10/2011 | Rosen | B23C 3/00 166/55 |
| 2016/0084381 | A1* | 3/2016 | Bjorsvik | F16J 15/0893 277/609 |
| 2021/0108754 | A1* | 4/2021 | Gage | F16L 41/06 |

OTHER PUBLICATIONS

Office Action issued in European Application No. 18710743.8, dated Oct. 21, 2022 (5 pages).

* cited by examiner

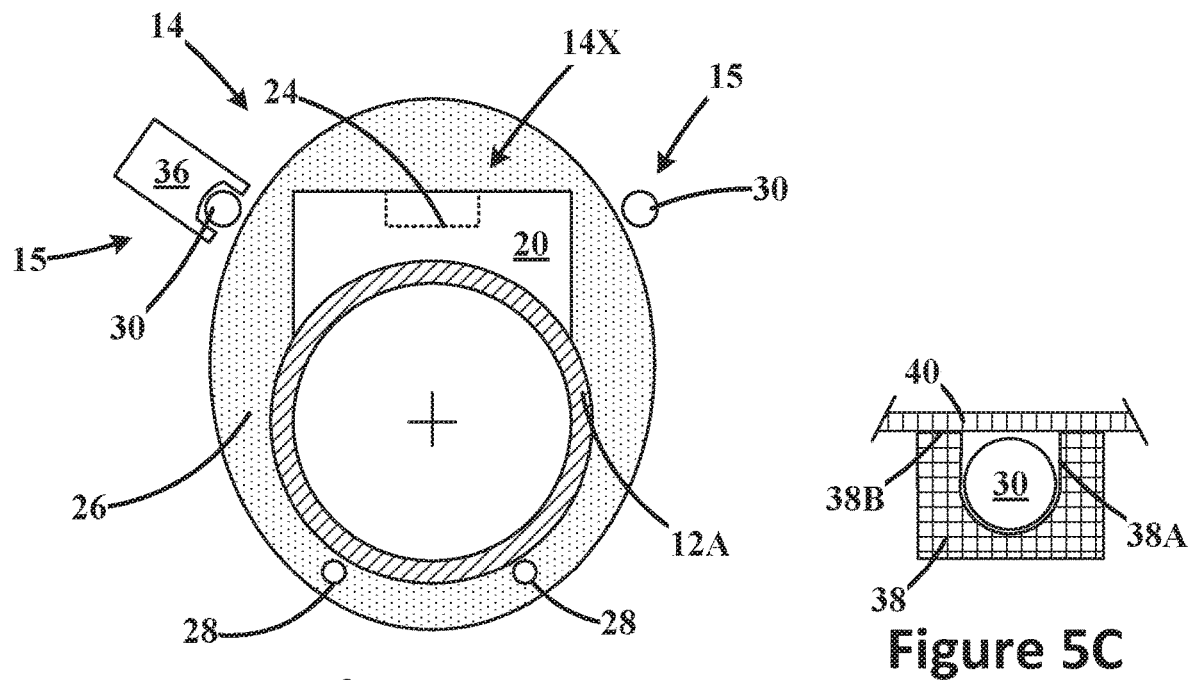
Figure 5A
Figure 5C
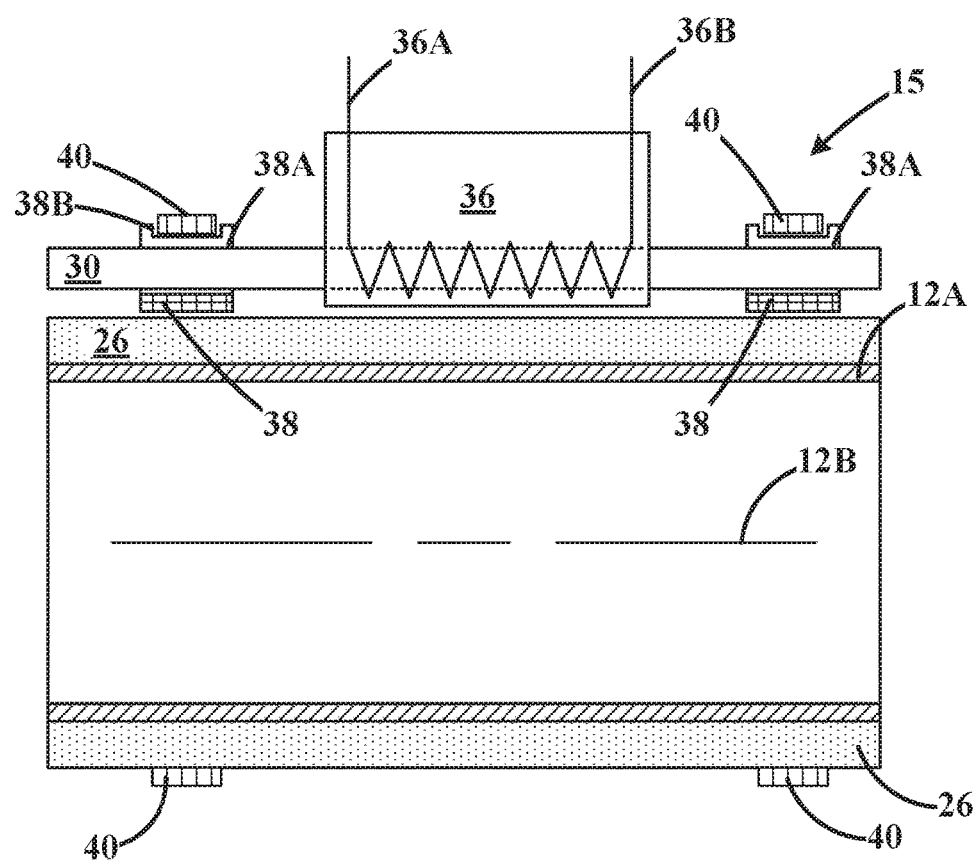
Figure 5B

Figure 21
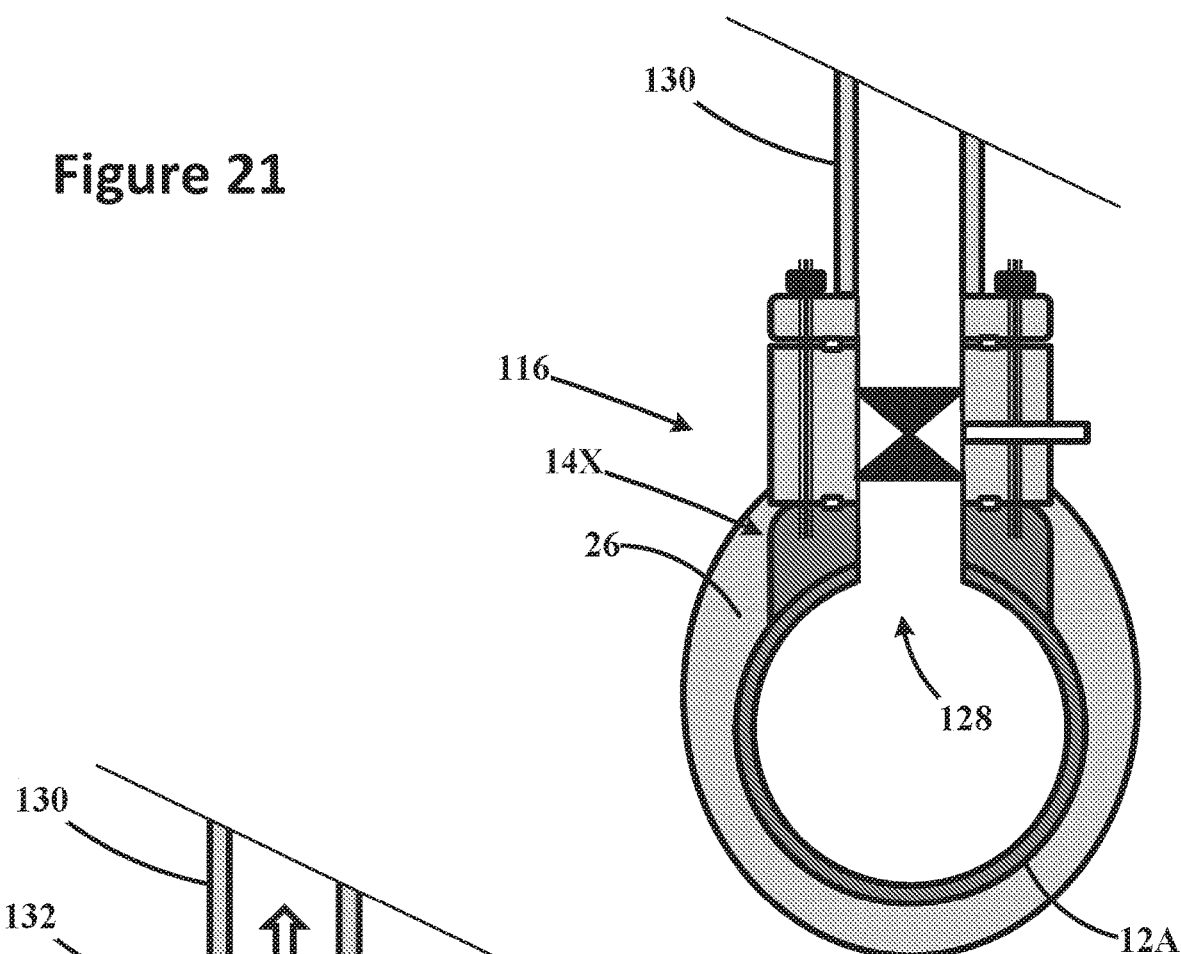
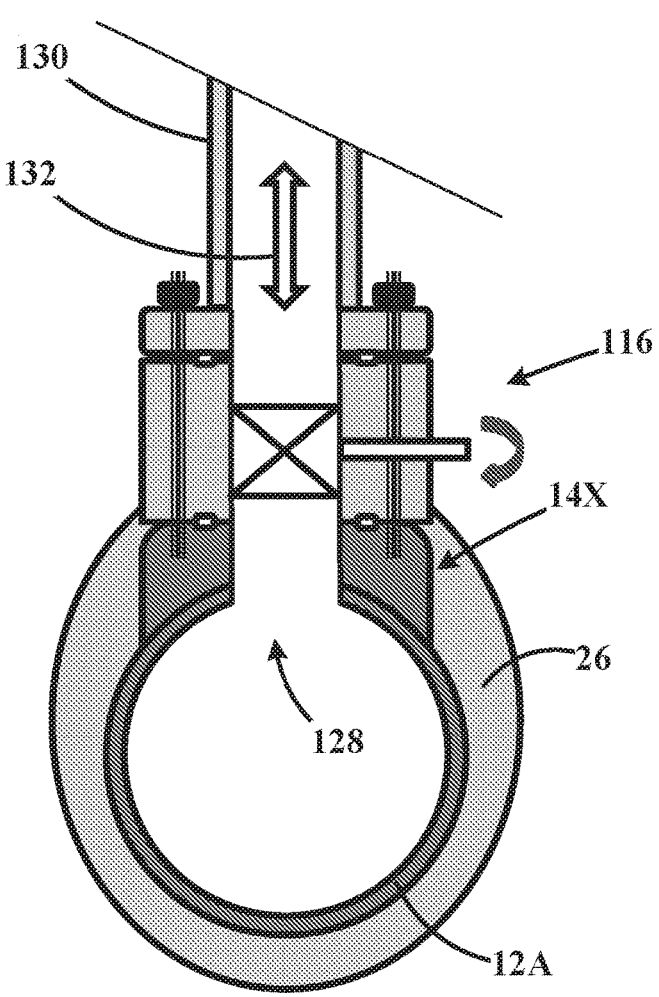
Figure 22

Figure 23
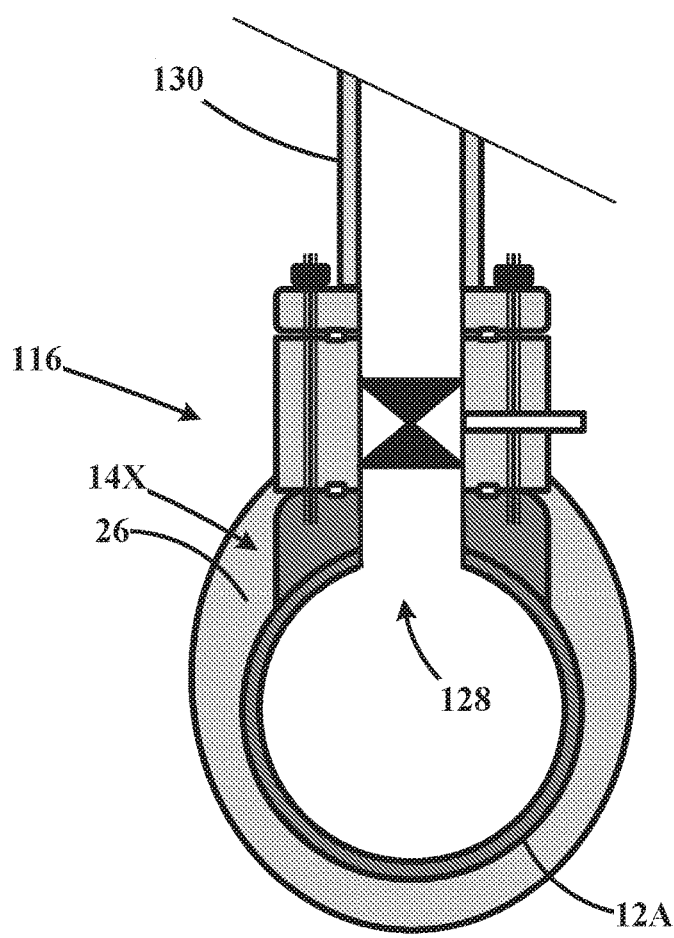
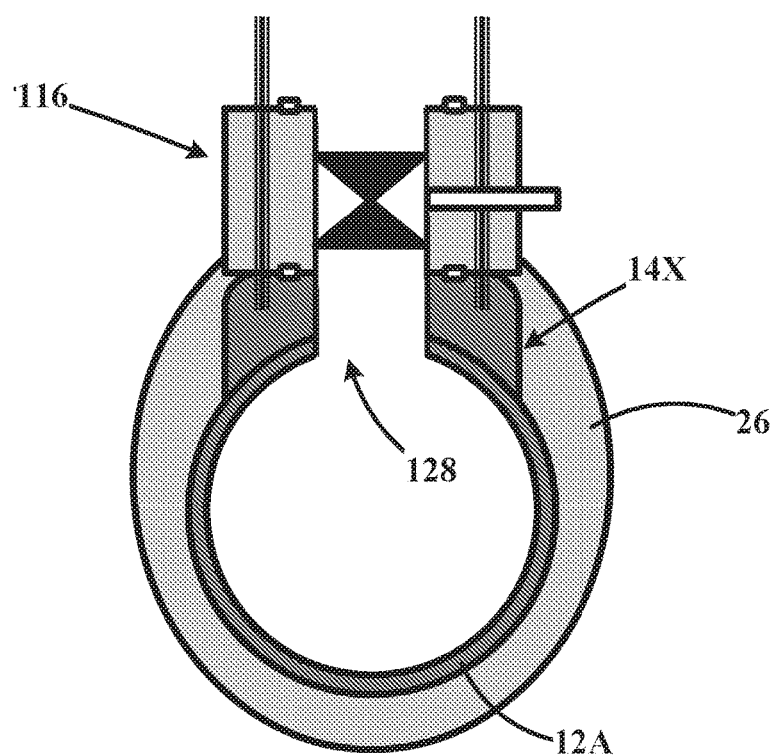
Figure 24

SUBSEA PIPELINE WITH MULTIPLE ACCESS NODES

TECHNICAL FIELD

In one aspect, the presently disclosed subject matter generally relates to various embodiments of a novel subsea pipeline that comprises multiple access nodes or tie-in locations that are pre-fabricated and pre-positioned at various locations in the pipeline, wherein these access nodes may be accessed on an as-needed basis as field development evolves over time.

BACKGROUND

Typically, to produce hydrocarbon-containing fluids from a subsea reservoir, several oil and gas wells are often drilled in a pattern that spaces the wells apart from each other. Each of the wells typically comprises a Christmas or production tree that is mounted on a wellhead. The tree is coupled to a production conduit such as a flowline or a jumper at the sea floor. The production conduits from the trees are typically coupled to other components such as manifolds, pipeline end terminations (PLETs), or other subsea processing units that collect or re-distribute the hydrocarbon-containing fluids produced from the wells.

When initial plans are made to produce hydrocarbon-containing fluids from a subsea reservoir, field developers must make some judgments as to the future development of the reservoir or field. Such decisions may include the anticipated location of various wells to be drilled into the reservoir as well as the anticipated location of certain items of subsea equipment that will be positioned subsea, such as Christmas (production) trees, manifolds, PLETs, flowlines, jumpers, pipelines, umbilicals, etc. At the time many of the original decisions are made with respect to the location and placement of various items of subsea equipment, the developer's knowledge about the capabilities of the reservoir in terms of production is somewhat limited. As development of the reservoir continues, i.e., as additional wells are drilled into the reservoir, developers acquire more and better information as it relates to the potential and actual development of the reservoir. Unfortunately, as this additional information about the field becomes available, the original decisions regarding the location of various items of subsea equipment may, in retrospect, not be ideal in terms of the efficient and economical consumption of subsea plot space (i.e., footprints) and/or efficient and economical production of hydrocarbon-containing fluids from the reservoir.

Typically, various utilities that are to be supplied to subsea production equipment, such as electrical power, communication lines, chemicals, etc., are supplied to the subsea equipment via relatively large and expensive bundled umbilicals that extend from a surface location, e.g., a platform to the subsea equipment. Such umbilicals may be relatively large in size and they can be very expensive to manufacture and install.

The present application is directed to various embodiments of a novel subsea pipeline system and utilities that comprise multiple pre-fabricated and pre-positioned access nodes or tie-in locations that may be accessed on an as-needed basis that may eliminate or at least minimize some of the problems noted above.

SUMMARY

The following presents a simplified summary of the subject matter disclosed herein in order to provide a basic understanding of some aspects of the information set forth herein. This summary is not an exhaustive overview of the disclosed subject matter. It is not intended to identify key or critical elements of the disclosed subject matter or to delineate the scope of various embodiments disclosed herein. Its sole purpose is to present some concepts in a simplified form as a prelude to the more detailed description that is discussed later.

The present application is generally directed to various embodiments of a novel subsea pipeline system that comprises multiple access nodes or tie-in locations that may be accessed on an as-needed basis. In one example, the system comprises a pipeline and a plurality of access node structures axially spaced apart from one another along the pipeline, wherein each of the plurality of access node structures comprises a substantially planar upper surface.

In another example, a method disclosed herein comprises deploying a pipeline that comprises a plurality of future access node structures, wherein, at the time the pipeline is deployed subsea, the future access node structures prevent access to an interior of the pipeline, and wherein the plurality of access node structures comprises at least one of a tapping structure, a pressure-barrier retaining structure that is adapted to receive a pressure-barrier device and a pressure-barrier retaining structure comprised of a recess with a scored pressure-retaining bottom.

BRIEF DESCRIPTION OF THE DRAWINGS

Certain aspects of the presently disclosed subject matter will be described with reference to the accompanying drawings, which are representative and schematic in nature and are not be considered to be limiting in any respect as it relates to the scope of the subject matter disclosed herein:

FIG. 5A is an end view and FIGS. 5B and 5C are partial cross-sectional side views of a portion of the pipeline that generally depicts how one or more illustrative utility lines may be strapped to the pipeline;

FIGS. 13-22 depict one illustrative method disclosed herein for tapping a pipeline via one access node structure disclosed herein after the pipeline was deployed subsea;

FIGS. 23-30 depict one illustrative method for plugging a previously formed tapped opening in the subsea pipeline or, when undertaken in the reverse order depicted in FIGS. 23-30, an illustrative method of removing a previously installed plug for gaining access into a pipeline via one of the illustrative access node structures disclosed herein;

Figure 1:
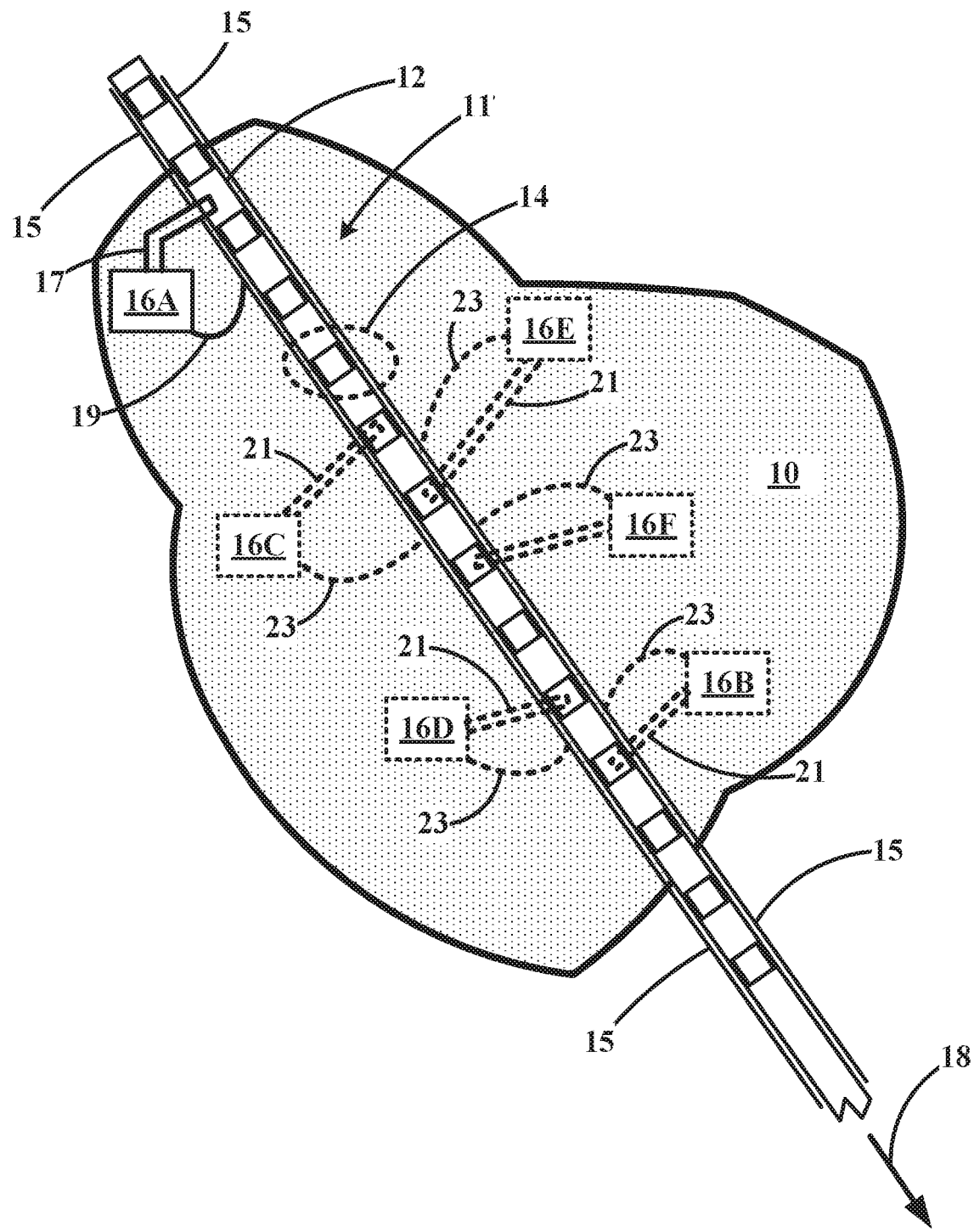
FIG. 1 depicts one illustrative embodiment of a subsea pipeline system disclosed herein for producing hydrocarbon-containing fluids from a subsea reservoir and/or introducing various fluids into the reservoir or various items of equipment positioned subsea.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DESCRIPTION OF EMBODIMENTS

Various illustrative embodiments of the disclosed subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 depicts one illustrative embodiment of a subsea pipeline system 11 disclosed herein that may be employed in performing a variety of operations as it relates to the general process of producing hydrocarbon-containing fluids 18 from a subsea reservoir 10. In general, in one illustrative embodiment, the subsea pipeline system 11 generally comprises a pipeline 12 with a plurality of future access nodes 14 spaced along the pipeline 12. In another embodiment, the system 11 may also comprise a plurality of utility lines 15 that are coupled, e.g., strapped to the pipeline 12. The utility lines 15 may include a variety of different utilities, including but not limited to, electrical power lines, electrical heating lines, chemical or liquid flow lines, electrical communication lines, fiber optic lines, control lines (electrical and/or hydraulic), etc. As will be appreciated by those skilled in the art after a complete reading of the present application, in one illustrative embodiment, the pipeline 12 may be used to receive and transport production fluid from various wells positioned subsea to a production facility. In another embodiment, water may be introduced into the pipeline 12 and ultimately introduced into one or more of the wells drilled in the reservoir 10. Thus, in the broadest sense, the pipeline 12 may be employed to receive any type of fluid (gas or liquid; single phase or multiple phase) from the reservoir 10 or from any equipment positioned subsea. Similarly, the pipeline 12 may be employed to introduce any type of fluid (gas or liquid; single phase or multiple phase) into the reservoir 10. The utility lines 15 may be used to supply one or more utilities (e.g., any fluids, controls or electrical power) to one or more items of equipment positioned subsea. For example, various chemicals in one or more of the utility lines 15 may be introduced into the wells drilled in the reservoir 10 or into any equipment positioned subsea.

The discussion below will primarily focus on the situation where the pipeline 12 is employed to receive production fluid from the reservoir 10 and transmit the production fluid to a production facility. However, as noted above, the novel system disclosed herein is not to be considered to be limited to this illustrative example. Additionally, depending upon the particular application, the pipeline 12 may be accessed (via one of the access nodes 14) when the pipeline 12 has a relatively high internal operating pressure, i.e., when the pipeline 12 is in operation, or when the pipeline 12 is non-operational, i.e., when the internal pressure within the pipeline 12 is at, above or below hydrostatic pressure.

The access nodes 14 may be accessed on an as needed basis (by performing various activities described more fully below) during the course of the development of the field. That is, in one example, as additional wells are drilled into the reservoir 10 over several years, one or more of the access nodes 14 may be accessed on an as-needed basis so as to permit production fluid from the additional wells to be introduced into the pipeline 12. The number and spacing of the access nodes 14 along the pipeline 12 may vary depending upon the particular application and a variety of factors such as, for example, the overall physical size of the reservoir 10. The access nodes 14 may be approximately equally spaced from one another along the pipeline 12 (as depicted in FIG. 1) or they may be randomly and/or unequally spaced and positioned along the pipeline 12. The position of the access nodes 14 along the pipeline 12 may be indicated by appropriate markings, e.g., painted lines and/or painted numbers on the outside of the pipeline 12 or the insulation positioned around the pipeline 12. Ultimately, as noted above, the hydrocarbon-containing fluids 18 produced from the reservoir 10 will flow through the pipeline 12 to a production facility, such as for example, a floating production vessel (not shown), a production facility located on a platform (not shown), an on-shore production facility (not shown) or a subsea production facility or item of equipment (not shown).

The physical size of the pipeline 12 may also vary depending upon the particular application. The spatial positioning of the subsea pipeline system 11 relative to the reservoir 10 may also vary depending upon the particular application and a variety of factors such as, for example, the anticipated location of various wells that will be drilled into the reservoir 10. In the example depicted in FIG. 1, the subsea pipeline system 11 is positioned such that the centerline of the pipeline 12 is positioned in the approximate middle of the reservoir 10. In other applications, the subsea pipeline system 11 may be positioned adjacent one side of the reservoir 10 or it may be positioned, in whole or part, completely outside of the area defined by the reservoir 10. The pipeline 12 may be made of a variety of different materials that are commonly used in the production of hydrocarbon-containing fluids such as, for example, carbon steel.

As noted above, in the illustrative example depicted in FIG. 1, the subsea pipeline system 11 also comprises illustrative and schematically depicted utility lines 15 that are coupled to the pipeline 12 by straps (not shown). As will be appreciated by those skilled in the art after a complete reading of the present application, the utility lines 15 are intended to be representative of any of a variety of different utilities that may be provided to equipment positioned subsea so as to allow operation, control and monitoring of the subsea equipment so as to produce hydrocarbon-containing fluids 18 from the reservoir 10 or introduce one or more fluids into the reservoir 10 and/or any subsea equipment. As noted above, the utility lines 15 may include, among other things, electrical power lines, electrical heating lines, chemical or liquid flow lines, electrical communication lines, fiber optic lines, control lines (electrical and/or hydraulic), etc. The number, size and location of such utility lines 15 that may be part of the overall subsea pipeline system 11 may vary depending upon the particular application. However, as will be appreciated by those skilled in the art after a complete reading of the present application, in some embodiments, the utility lines 15 may be omitted from the subsea pipeline system 11, and the utilities needed by various items of subsea equipment to produce hydrocarbon-containing fluids 18 from the reservoir 10 may be supplied by one or more traditional bundled umbilical lines (not shown) that extend from a surface structure, such as a platform, to the equipment on the sea floor.

In one illustrative example, the subsea pipeline system 11 may be installed or positioned above the reservoir 10 at a very early point during the process of developing the reservoir 10. In effect, the subsea pipeline system 11, with the plurality of access nodes 14 positioned therein, may constitute a primary pipeline or production backbone for the overall reservoir 10. In general, the development of the reservoir 10 will likely grow or increase over the years, i.e., additional wells will be drilled into the reservoir 10 and/or additional subsea processing equipment will be positioned above or adjacent the reservoir 10 to produce all of the hydrocarbon-containing fluids 18 from the various wells drilled into the reservoir 10. The hydrocarbon-containing fluids 18 produced from these additional wells may be tied into the pipeline 12 by accessing (using one or more of the techniques and devices described more fully below) one or more of the access nodes 14 such that the produced hydrocarbon-containing fluids 18 will flow through the pipeline 12 to the final production facility. The utilities for these additional wells and/or additional subsea equipment may also be provided by coupling to or accessing one or more of the utility lines 15 (as described more fully below) that are coupled to the pipeline 12.

Still referencing FIG. 1, various items of subsea production equipment 16A-16F (generally referenced using the numeral 16) that are schematically depicted in FIG. 1 may be positioned subsea and operatively coupled to the pipeline 12 at any desired point in time by accessing one or more of the access nodes 14 on an as-needed basis. The production equipment 16 should be understood to be representative of any type of equipment that may be positioned subsea and assist in at least some manner with the production of the hydrocarbon-containing fluids 18 from the reservoir 10. For example, the production equipment 16 may comprise, among other things, a Christmas or production tree, a flow manifold, a subsea separator vessel, the outlet of a subsea pump, the inlet of a subsea pump, another pipeline (not shown), a PLET (inline or not inline), skid mounted equipment, etc. Each schematically depicted item of subsea production equipment 16A-16F should be understood to be representative of one or more items of subsea equipment.

In the example depicted in FIG. 1, the production equipment 16A is the initial production equipment that was installed for the first well drilled in the reservoir 10, and the subsea production equipment 16A was installed at or about the same time as the subsea pipeline system 11 was laid or positioned above the reservoir 10. As indicated, the subsea production equipment 16A was directly coupled to the pipeline 12 by the schematically depicted flow line 17 via a plurality of mating flanges (not shown). That is, the initial subsea production equipment 16A was not operatively coupled to the pipeline 12 by accessing one of the access nodes 14, although such a situation could occur in some applications.

As also depicted in FIG. 1, one or more utilities were provided to the production equipment 16A by accessing the utility lines 15, as indicated by the solid curved line 19. After the installation of the initial subsea production equipment 16A, the additional items of subsea production equipment 16B-16F were sequentially positioned above the reservoir 10 over a period of time as the development of the reservoir 10 was continued, i.e., as additional wells were drilled into the reservoir 10. The items of subsea production equipment 16B-16F are depicted in dashed lines so as to reflect the positioning of these additional items of subsea production equipment 16B-16F above the reservoir 10 over time. As each of these additional items of subsea production equipment 16B-16F are positioned subsea, they will be operatively coupled to the pipeline 12 by accessing the pipeline 12 via one or more of the access nodes 14, as simplistically depicted by the dashed lines 21. One or more utilities may be provided to each of these additional items of subsea production equipment 16B-16F by accessing the utility lines 15, as indicated by the dashed curved line 23.

In general, various techniques and devices may be employed to access the pipeline 12 at the access nodes 14. Each of the access nodes 14 comprises an access node structure 14X that, in one embodiment, may be formed integral with the pipeline 12 prior to positioning the pipeline 12 subsea. The access node structure 14X may take a variety of different forms and may employ different techniques and devices to gain access to the pipeline 12 via one of the access nodes 14. In one illustrative example, the access node structure 14X takes the form of a tapping structure 20 that is adapted to allow tapping (hot or cold) of the pipeline 12 by performing various machining activities.

Figure 2A:
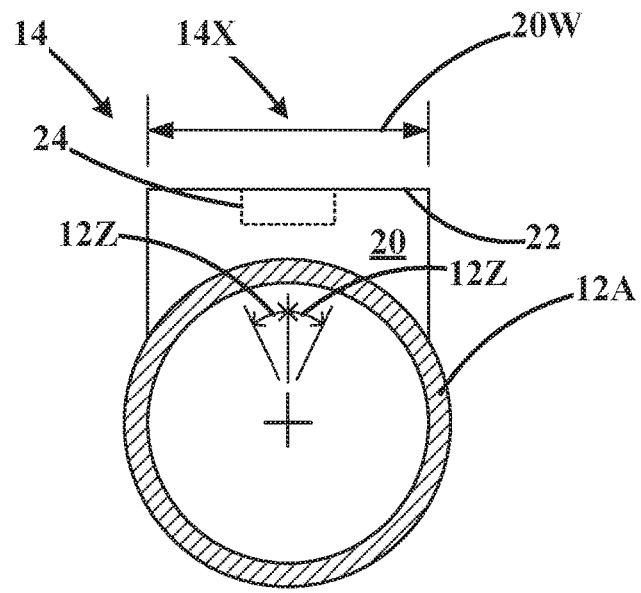
FIGS. 2A and 2B are, respectively, an end view and a cross-sectional side view of a portion of a pipeline that depicts various illustrative structures associated with an illustrative example of an access node structure that is located at a future access point on the pipeline.
Figure 2B:
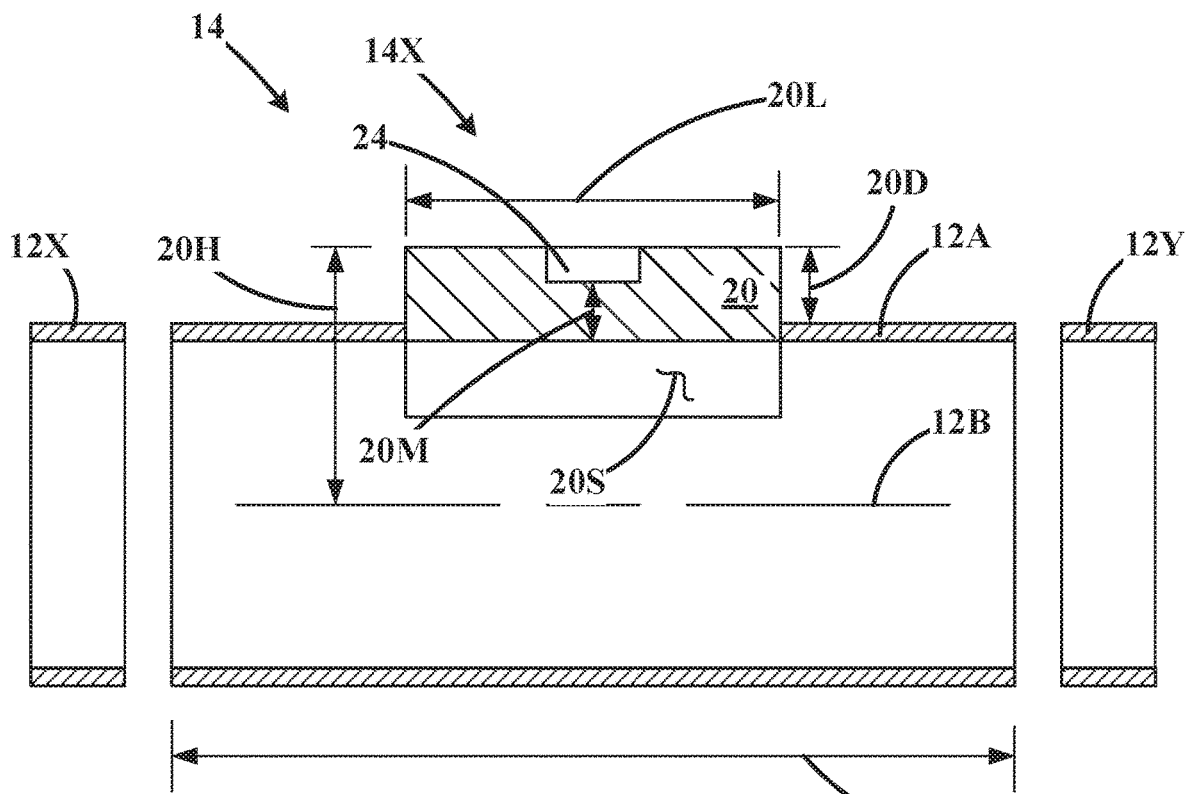

FIGS. 2A and 2B are, respectively, an end view and a cross-sectional side view of a portion of the pipeline 12 and an illustrative example of various structures associated with an illustrative tapping structure 20 that is positioned at one or more of the access nodes 14. As indicated, in one illustrative embodiment, the tapping structure 20 is integrally formed with an access node section of pipe 12A (with a centerline 12B) of the pipeline 12. The access node section of pipe 12A is adapted to be coupled to (e.g., welded to) other sections 12X, 12Y of the pipeline 12. The other sections 12X, 12Y of the pipeline 12 may or may not comprise tapping structures 20.

In some applications, the access node section of pipe 12A may be coupled to the other sections (e.g., 12X, 12Y) of the pipeline at an on-shore location so as to establish a substantially continuous pipeline 12 with several of the tapping structures 20 spaced apart along the continuous pipeline 12. At that point, as described more fully below, the substantially continuous pipeline (with the tapping structures 20) may be positioned on or wrapped around a reel of a pipe-laying vessel, as described more fully below. In other applications, the pipeline 12 may be substantially completely fabricated aboard a pipe-laying vessel by welding the access node sections of pipe 12A (with the tapping structure 20 attached thereto) into position between other sections of the pipeline 12 that may or may not comprise a tapping structure 20. In either situation—the fabrication of a substantially continuous pipeline on-shore or the fabrication of the pipeline 12 on a section-by-section basis on board a pipe-laying vessel—the pipeline 12 will be deployed into the sea and positioned on the sea floor at the desired location relative to the reservoir 10 as the sea-going pipe-laying vessel moves above the reservoir 10. In one particular application, and as described more fully below, at the same time the pipeline 12 is being deployed off of the pipe-laying vessel into the sea, one or more utility lines 15 may be strapped to the pipeline 12 and deployed into the sea along with the pipeline 12. The axial length 12L of the access node section of pipe 12A may vary depending upon the application. In one illustrative embodiment the axial length 12L may be about 1-3 m. The tapping structure 20 may be comprised of the same material as that of the pipeline 12 or it may be made of a different material than that of the pipeline 12.

Still referencing FIGS. 2A-2B, the tapping structure 20 may take a variety of different forms or configurations, and the physical size of the tapping structure 20 may vary depending upon the particular application. In the illustrative examples depicted herein, the tapping structure 20 has a generally rectangular configuration (when viewed from above) with a lateral width 20W and an axial length 20L. However, it is not required that all of the tapping structures 20 on the pipeline 12 be of the same size and configuration, although that may be the case in some applications. The tapping structure 20 may be sized such that it has a relatively small projection 20D above the outer surface of the pipeline 12. In the depicted example, the tapping structure 20 comprises a substantially planar upper surface 22 and an alignment/coupling recess 24 defined in the body of the tapping structure 20. In other embodiments, the alignment/coupling recess 24 may be omitted. In yet other embodiments, the tapping structure 20 may comprise a plurality of alignment/coupling recesses that are adapted to facilitate alignment of a machining tool that is to be coupled to the access node structure 14X, wherein the machining tool is adapted to be used to machine an opening that extends through the access node structure 14X and provides fluid access to the internal of the pipeline 12. In one illustrative embodiment, the alignment/coupling recess 24 may have a generally circular configuration when viewed from above. The depth of the alignment/coupling recess 24 may also vary depending upon the particular application. However, the depth of the alignment/coupling recess 24 should be controlled such that there is enough material 20M remaining below the bottom of the alignment/coupling recess 24 to withstand all anticipated forces (e.g., pressure and/or mechanical forces) to be applied to the tapping structure 20 during, for example, installation, commissioning, operation and abandonment of the pipeline 12.

As indicated in FIG. 2B, the tapping structure 20 may be sized such that the substantially planar upper surface 22 is located a desired vertical distance 20H above the centerline 12B of the pipeline 12. The tapping structure 20 may be forged with a machined inner surface 20S that matches the inner surface of the pipeline 12, wherein the tapping structure 20 is welded into an opening cut in the pipeline 12. In other applications, the tapping structure 20 may simply be welded into position on the outside surface of the pipeline 12. In one embodiment, the lateral width 20W of the tapping structure 20 may be less than the outside diameter of the pipeline 12 to facilitate wrapping a continuous pipeline 12 of a reel of a pipe-laying vessel, as described more fully below. In general, as noted above, the physical dimensions of the tapping structure 20 may vary depending upon the particular application. However, in one illustrative embodiment, the lateral width 20W may be as small as about one-half the outside diameter of the pipe 12 but no greater than the outside diameter of the pipe 12. In one illustrative example, the axial length 20L of the tapping structure 20 may be about 0.5-3 m. In one illustrative embodiment, the projection 20D may be approximately equal to the wall thickness of the pipe 12 up to about double the outside diameter of the pipe 12. With reference to FIG. 2A, when the pipeline 12 is positioned on the sea floor, the planar upper surface 22 will ideally be oriented substantially normal to the vertical. However, such exact precision in the orientation of the planar upper surface 22 is not required, i.e., in one illustrative embodiment, the pipeline 12 may be rotated plus or minus about 15 degrees (and preferably at most about 5 degrees) as represented by the arrows 12Z and still function as intended.

Figure 3A:
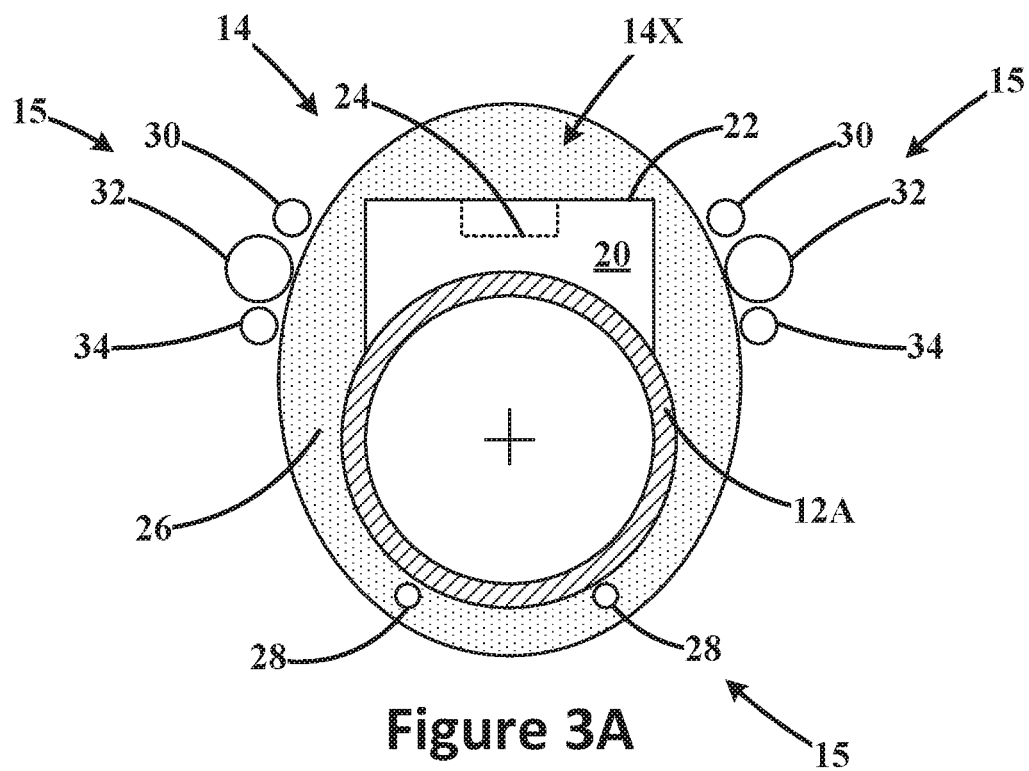
FIGS. 3A and 3B are, respectively, an end view and a cross-sectional side view of another embodiment of a portion of a subsea pipeline system disclosed herein wherein a thermal insulation material has been positioned around an illustrative example of an access node structure disclosed herein.
Figure 3B:
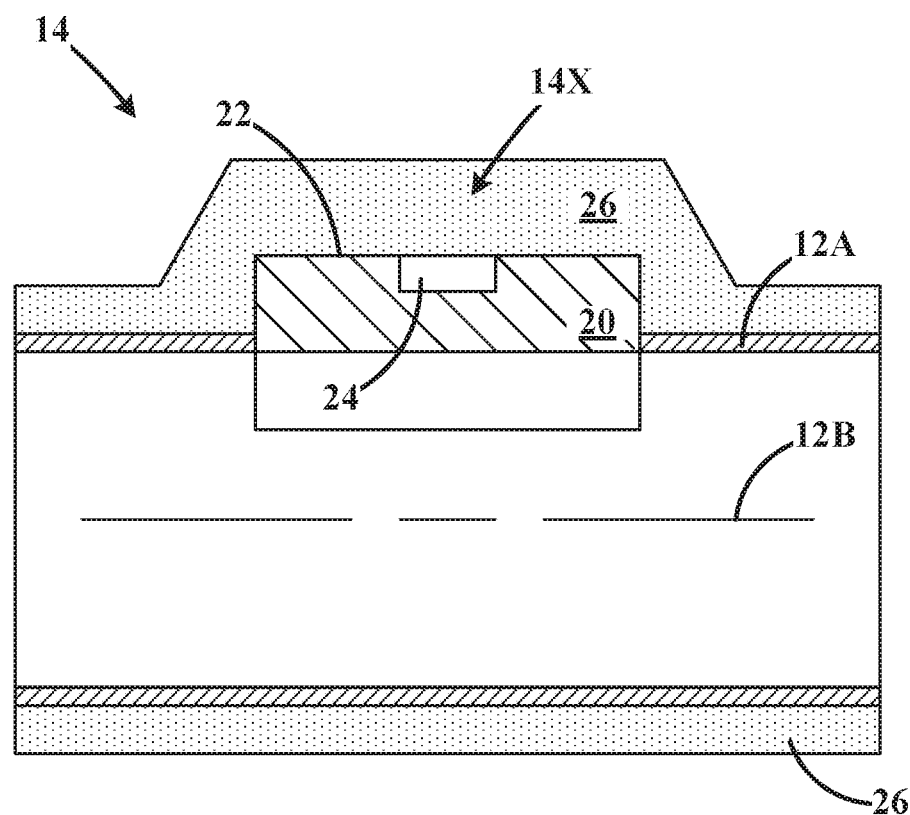

FIGS. 3A and 3B are, respectively, an end view and a cross-sectional side view of another embodiment of a portion of a subsea pipeline system 11 disclosed herein. In this example, relative to the embodiment shown in FIGS. 2A-2B, thermal insulation material 26 has been positioned around the pipeline 12 and an illustrative tapping structure 20. Also depicted are various utility lines 15 that have been strapped to the outside of the pipeline 12 as it was deployed into the sea. As noted above, the utility lines 15 may provide various utilities to the equipment positioned on the sea floor and/or perform various functions. For example, in the depicted example, electrical heating lines 28, electrical power lines 30, liquid (e.g., chemical) supply lines 32 and fiber optic communications lines 34 are strapped to the pipeline 12. Note that, in the depicted example, there are redundant lines for the various utilities 15. Of course, the number, size, location and functions of the various utility lines 15 strapped to the pipeline may vary depending upon the particular application. Additionally, in some embodiments, although one or more utility lines 15 are coupled to the pipeline 12, additional utilities may be provided to subsea equipment positioned adjacent the pipeline 12 by one or more traditional umbilicals (not shown) on either a permanent or temporary basis.

Figure 4:
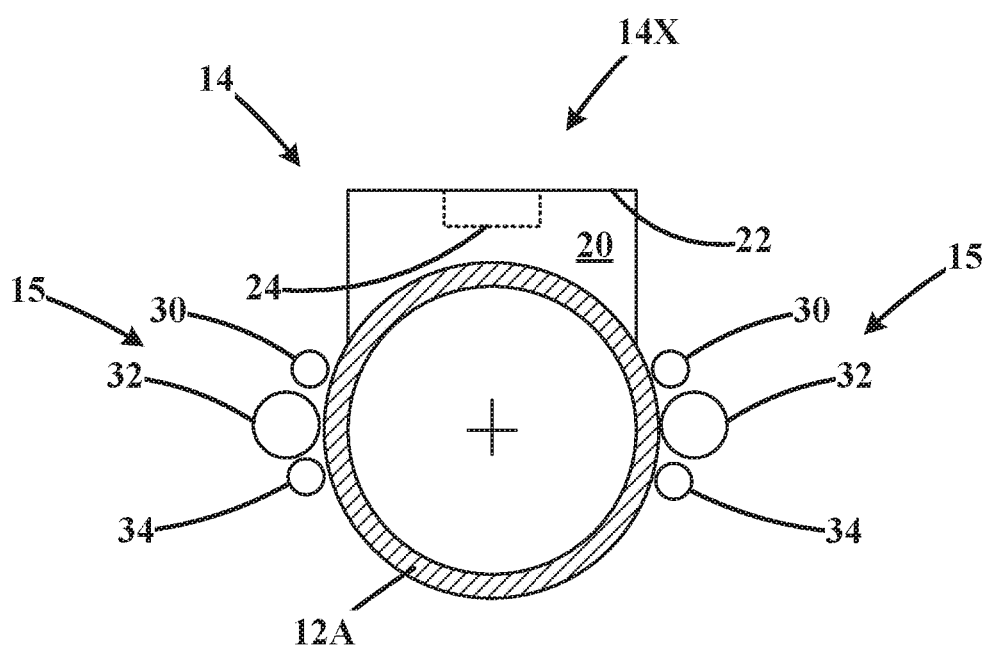
FIG. 4 depicts an embodiment of a subsea pipeline system disclosed herein where there is no insulation material provided around an illustrative example of an access node structure disclosed herein.

FIG. 4 depicts an embodiment of a subsea pipeline system 11 wherein there is no insulation material 26 provided on the pipeline 12. In this example, the utility lines 15 include the above-mentioned electrical power lines 30, liquid (e.g., chemical) supply lines 32 and fiber optic communications lines 34 that have been strapped to the pipeline 12. In this example, the electrical heating lines 28 have been omitted.

FIG. 5A is a cross-sectional view of a portion of the pipeline 12 taken across the diameter of the pipeline 12. FIG. 5B is a partial cross-sectional side view (with the tapping structure 20 omitted) taken through the centerline 12B of the pipeline 12. The figures will be referenced to generally describe one illustrative technique for attaching the utility lines 15 to the pipeline 12 and how the electrical power lines 30 may be accessed as equipment is periodically installed subsea so as to supply electrical power to the equipment. In this example, the subsea pipeline system 11 comprises the above-mentioned insulation material 26, the electrical heating lines 28 and the electrical power lines 30 that were all attached to the pipeline 12 at the time the subsea pipeline system 11 was being lowered into the sea.

In one illustrative embodiment, at some point in time after the subsea pipeline system 11 was positioned subsea, additional equipment (not shown) was positioned subsea so as to continue the development of the reservoir 10. For example, after the original subsea pipeline system 11 was first positioned subsea, a decision was made to drill another well into the reservoir and associated production equipment, such as a Christmas tree (i.e., a production tree) was positioned on the latest well. With reference to FIGS. 5A and 5B, electrical power for such subsea equipment may be supplied by use of an induction coupling clamp 36 that is positioned around a portion of one of the electrical power lines 30. The structure, function and operation of such induction coupling clamps are well known to those skilled in the art. The leads 36A, 36B may be coupled to the newly-added subsea equipment. To the extent that the portion of the electrical power line 30 that is to be accessed is covered by insulation material 26, such insulation material 26 may be removed by use of an ROV. The installation of the induction coupling clamp 36 and the coupling of the leads 36A, 36B to the subsea equipment may also be accomplished by use of an ROV. Of course, a fiber tapping device (not shown) may be positioned around a portion of one of the fiber optic communications lines 34 (not shown in the FIG. 5 drawings) so as to provide a communications link with the newly-added subsea equipment.

FIGS. 5B and 5C depict one illustrative example of a utilities support block 38 that may be used when coupling the utility lines 15 to the pipeline 12. In this example, the utilities support block 38 comprises an open-ended slot 38A and a strap recess 38B. FIG. 5B includes a cross-sectional view of the utilities support block 38 taken through the center of the slot 38A in a direction parallel to the centerline 12B of the pipeline 12. FIG. 5C is a cross-sectional view of the utilities support block 38 taken through the slot 38A in a direction that is transverse to the centerline 12B of the pipeline 12. After the electrical power line 30 is positioned within the slot 38A, a band or strap 40 is wrapped about the pipeline 12 and positioned within the strap recess 38B. In this embodiment, the strap 40 insures that the electrical power line 30 remains positioned within the slot 38A. The strap recess 38 insures that the strap 40 remains in position above the slot 38A. Of course, the utilities support block 38 may comprise any desired number of such slots 38A to accommodate the desired number and size of the various utility lines 15 that are coupled to the pipeline 12.

Figure 6A:
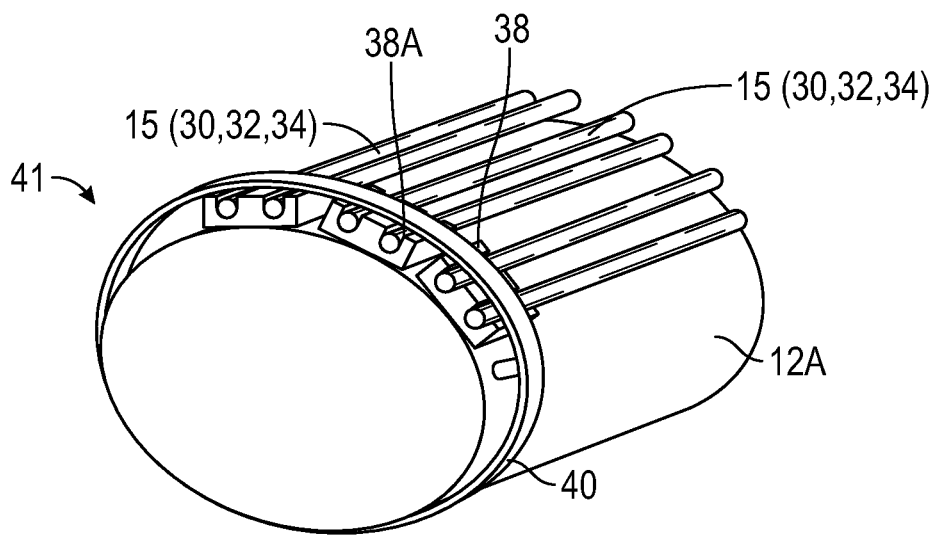
FIGS. 6A-6C are, respectively, perspective, plan and cross-sectional side views of embodiments of illustrative utilities support blocks disclosed herein that may be strapped to the pipeline.
Figure 6B:
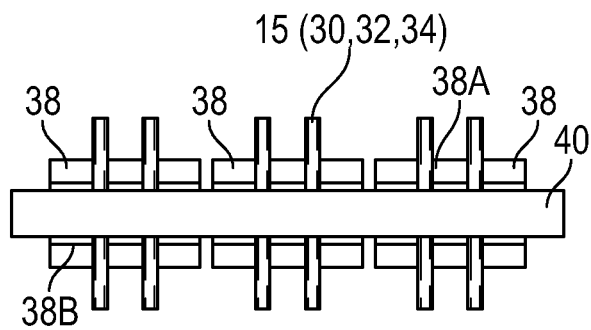
Figure 6C:
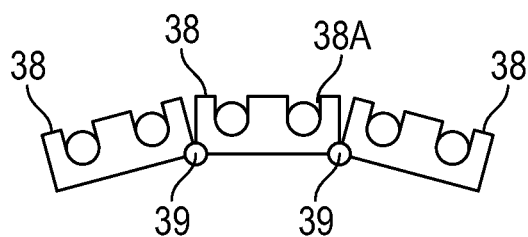

FIGS. 6A-6C are, respectively, perspective, plan and cross-sectional side views of embodiments of the illustrative utilities support blocks 38 (with various utility lines 15 positioned therein) that may be strapped to the pipeline 12 using the depicted strap or band 40. FIG. 6A depicts one illustrative utilities attachment location 41 along the pipeline 12 where three illustrative utilities support blocks 38 have been strapped to the pipeline 12 using the band or strap 40. Of course, any desired number of such utilities support blocks 38 may be employed at each utilities attachment location 41. The number and spacing of the utilities attachment locations 41 along the pipeline 12 may vary depending upon the particular application and a variety of factors. The utilities attachment locations 41 may be equally spaced from one another along the pipeline 12 or they may be randomly and/or unequally spaced and positioned along the pipeline 12. The position of the utilities attachment location 41 along the pipeline 12 may be indicated by appropriate markings, e.g., painted lines and/or painted numbers on the outside of the pipeline 12 or the insulation positioned around the pipeline 12. In this example, each of the utilities support blocks 38 comprises a plurality of open-ended slots 38A and an above-described strap recess 38B. Any of the above-mentioned utility lines 15, e.g., the lines 30, 32, 34, etc., may be positioned in the slots 38A. In the case wherein heating elements 28 are employed, the heating elements 28 may be positioned so as to contact the outer surface of the pipeline 12 for more effective heat transfer. In such a situation, the heating elements 28 may be positioned in downward facing open-ended slots (not shown) formed in the utilities support blocks 38. As best seen in FIG. 6C, in this example, a hinge 39 is provided between adjacent utilities support blocks 38 so as to couple the utilities support blocks 38 to one another and to allow the group of the three utilities support blocks 38 to approximately conform to the outer surface of the pipeline 12.

Figure 7A:
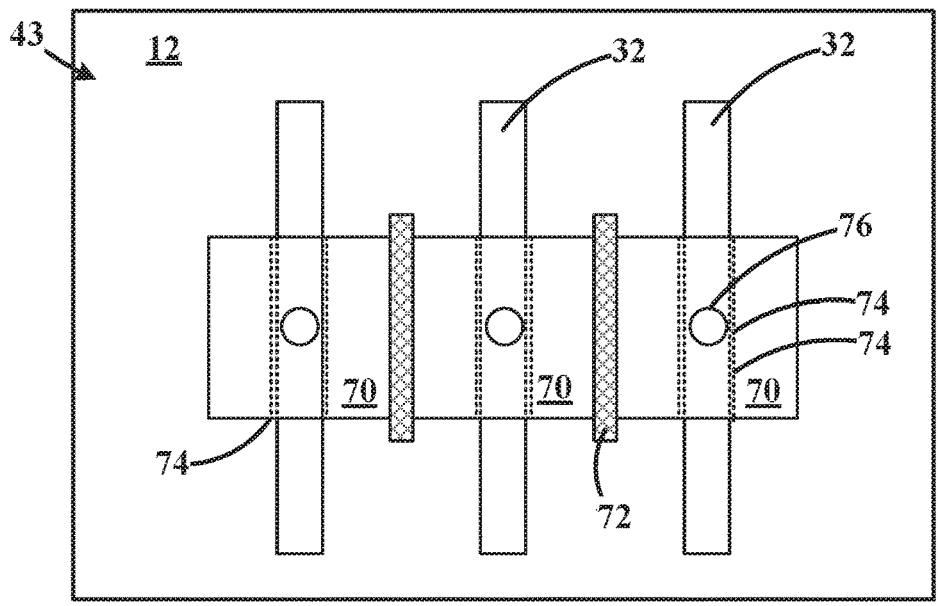
FIGS. 7A and 7B are, respectively, plan and cross-sectional side views of illustrative embodiments of a plurality of fluid tapping support blocks that may be coupled or strapped to the pipeline.
Figure 7B:
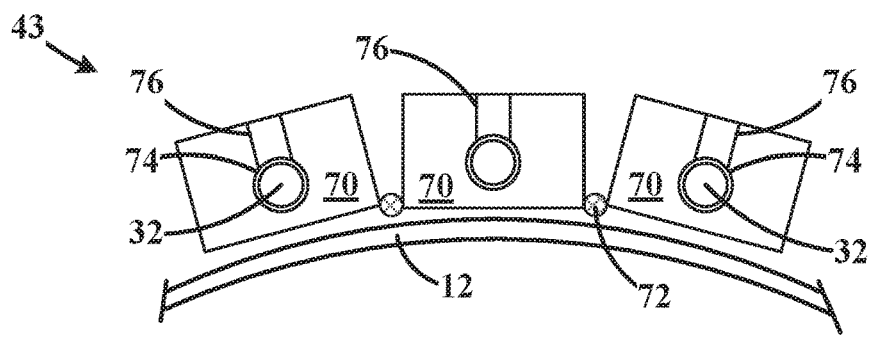

FIGS. 7A and 7B are, respectively, plan and cross-sectional side views of illustrative embodiments of a plurality of fluid tapping support blocks 70 that are also adapted to be coupled or strapped to the pipeline 12 at various fluid tapping attachment locations 43 along the pipeline 12. The fluid tapping support blocks 70 may comprise one or more openings 74 that are adapted to receive a liquid-carrying utility line 15, e.g., the above-mentioned liquid (e.g., chemical) supply line 32. The illustrative fluid tapping support blocks 70 (with various liquid-carrying utility lines 15 positioned therein) may be strapped to the pipeline 12 using a strap or band (not shown in the FIG. 7 drawings) such as the above-depicted strap or band 40. Strap recesses (not shown in the FIG. 7 drawings) similar to the above-described strap recesses 39 may also be formed in the fluid tapping support blocks 70.

FIGS. 7A-7B depict illustrative fluid tapping attachment locations 43 along the pipeline 12 where three illustrative fluid tapping support blocks 70 have been strapped to the pipeline 12. Of course, any desired number of such fluid tapping support blocks 70 may be employed at each fluid tapping attachment location 43. The number and spacing of the fluid tapping attachment locations 43 along the pipeline 12 may vary depending upon the particular application and a variety of factors. The fluid tapping attachment locations 43 may be equally spaced from one another along the pipeline 12 or they may be randomly and/or unequally spaced and positioned along the pipeline 12. The position of the fluid tapping attachment locations 43 along the pipeline 12 may be indicated by appropriate markings, e.g., painted lines and/or painted numbers on the outside of the pipeline 12 or the insulation positioned around the pipeline 12. In this example, each of the fluid tapping support blocks 70 comprises only a single opening 74 that is drilled through the block 70. In practice, each of the fluid tapping support blocks 70 may comprise any desired number of such openings 74. In the depicted example, each of the fluid tapping support blocks 70 comprises a drilled and tapped opening 76 that is positioned so as to expose and provide access to a portion of the liquid-carrying utility line 15 positioned within the opening 74. As best seen in FIG. 7B, in this example, a hinge 72 is provided between adjacent fluid tapping support blocks 70 so as to couple the fluid tapping support blocks 70 to one another and to allow the group of the three fluid tapping support blocks 70 to approximately conform to the outer surface of the pipeline 12.

In one illustrative example, a liquid-carrying utility line 15 is positioned within the opening 74 in the fluid tapping support blocks 70. A seal may be formed between the liquid-carrying utility line 15 and the fluid tapping support blocks 70 at the ends of the opening 74. Such a seal may be effectuated in a variety of different ways, e.g., by welding, swaging, heat-expansion, threading, etc.

Figure 7C:
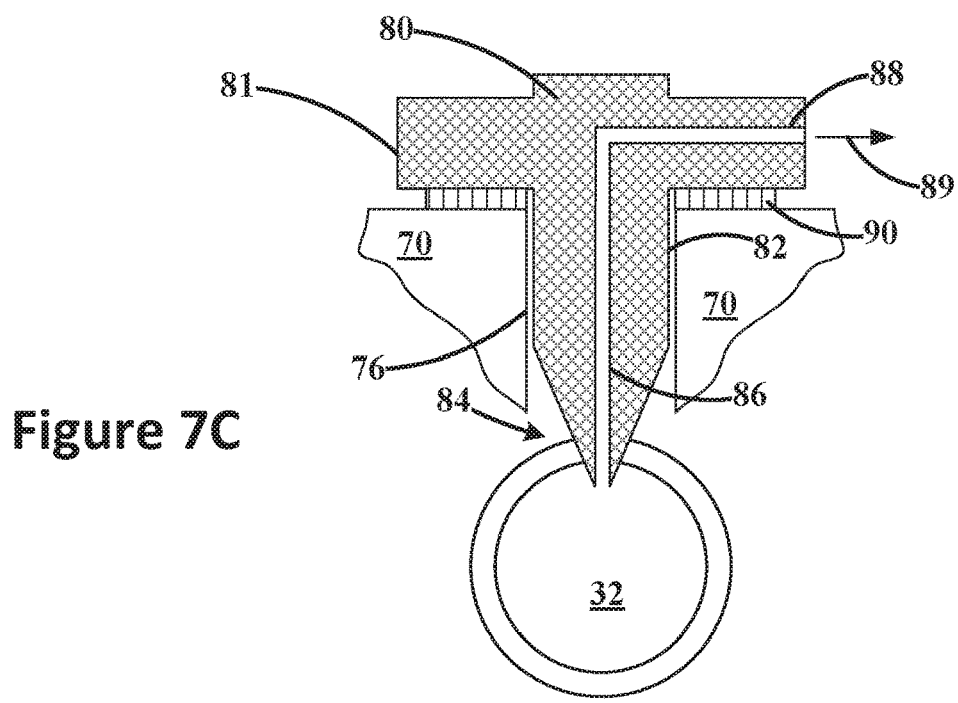
FIG. 7C depicts one illustrative example of an externally threaded tapping structure that may be coupled to a fluid tapping support block.

In one illustrative embodiment, as shown in FIG. 7C, the tapped opening 76 is adapted to threadingly receive an externally threaded tapping structure 80 (the external threads being indicated by the reference numeral 82). In one illustrative embodiment, the tapping structure 80 comprises a plurality of wrench flats 81 and a fluid passageway 86 that extends through the body of the tapping structure 80. A pointed end 84 is provided at one end of the fluid passageway while a fluid outlet 88 is provided at the opposite end of the fluid passageway 86.

In one illustrative process, when the combination of the fluid tapping support blocks 70 with the liquid-carrying utility line 32 positioned therein is initially strapped to the pipeline 12, the tapping structure 80 is partially threaded into the opening 76 such that a seal is established between the tapping structure 80 and the opening 76 due to the interactions of the threads. In this initially installed position, the tapping structure 80 does not extend into the opening 76 a sufficient depth such that the pointed end 84 of the tapping structure 80 engages and penetrates the liquid-carrying utility line 32. The combination of the pipeline 12 with the attached fluid tapping support blocks 70 is then lowered into the sea with the tapping structure 80 in this initial, non-penetrating position within the opening 76 in the fluid tapping support blocks 70.

At some point later in time it may be desirable to tap the liquid-carrying utility line 32 so as to provide a fluid, e.g., a chemical, in the liquid-carrying utility line 32 to an item of subsea equipment (either recently installed or previously installed) positioned near the pipeline 12. At that time, an ROV may be used to turn the tapping structure 80 so as to force it further into the opening 76 in the fluid tapping support blocks 70. This process continues until such time as the pointed end 84 of the tapping structure 80 engages and penetrates the liquid-carrying utility line 32 thereby allowing fluid (as represented by the arrow 89) from within the liquid-carrying utility line 32 to flow into the passageway 86 and out of the fluid outlet 88. A suitable conduit (not shown) may be provided between the fluid outlet 88 and the subsea equipment. An illustrative seal 90 is provided between the tapping structure 80 and the fluid tapping support block 70 such that a fluid tight seal is established when the tapping structure 80 is in this fully-inserted and line-penetrating position. Of course, the illustrative example of the tapping structure 80 is provided by way of example only and other forms of tapping structures may be employed such as, for example, a push-fit hydraulic snap-in connector, a banjo type fitting, etc.

In other embodiments, the liquid-carrying utility line 32 may be penetrated on board the pipe-laying vessel after the liquid-carrying utility line 32 has been positioned in the fluid tapping support block 70 and sealed therein. Thereafter, a simple threaded plug (not shown) may be positioned in the tapped opening 76. The plug may be removed at a later date when access to the liquid-carrying utility line 32 is needed.

Figure 8:
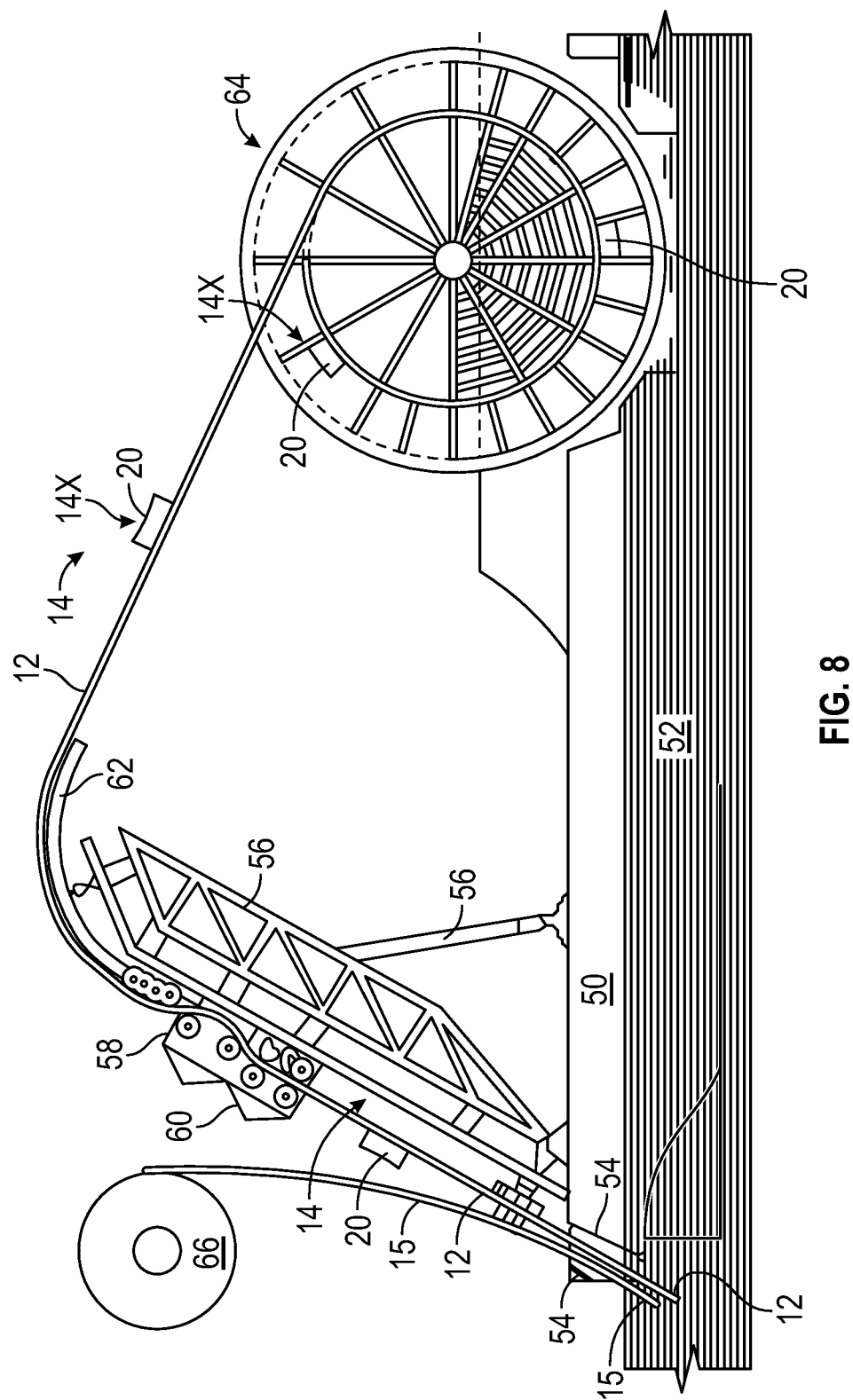
FIG. 8 simplistically depicts an illustrative pipe-laying vessel that may be employed when deploying illustrative embodiments of the subsea pipeline systems disclosed herein.

As indicated above, in one illustrative embodiment, the pipeline disclosed herein may take the form of a continuous pipeline 12 with several of the access nodes 14 spaced apart along the continuous pipeline 12 that is adapted to be positioned on or wrapped around a pipeline reel 64 of a pipe-laying vessel 50. FIG. 8 simplistically depicts an illustrative pipe-laying vessel 50 that is positioned above a body of water 52. The vessel 50 comprises an opening 54 through which the pipeline 12 (that includes a plurality of illustrative access node structures 14X, such as the illustrative tapping structures 20) may be deployed into the water. In some embodiments, the pipeline system 11 may also comprise a plurality of utility lines 15 that are attached to the pipeline 12 as the pipeline is un-reeled from the pipeline reel 64 wherein the combination of the pipeline 12 (that includes a plurality of access node structures 14X) and the utility lines 15 attached to the pipeline 12 are deployed into the water 52 at the same time via the opening 54.

In one illustrative embodiment, the pipe-laying vessel 50 comprises a structural support mechanism 56, a pipeline straightener mechanism 58, a pipeline tensioner mechanism 60 and a pipeline aligner mechanism 62. As depicted, in one illustrative embodiment, the pipeline 12 (that includes a plurality of access node structures 14X) is wrapped around the pipeline reel 64 prior to being deployed in the water 52. In general, and as will be appreciated by those skilled in the art after a complete reading of the present application, when the pipeline 12 is initially wrapped around the pipeline reel 64, the pipeline 12 undergoes plastic deformation such that it maintains its generally circular "as-reeled" configuration when it is positioned on the pipeline reel 64. When the pipeline 12 is deployed or "un-wrapped" from the pipeline reel 64, the pipeline 12 will again be plastically deformed into a substantially linear configuration as it is un-wound from the pipeline reel 64 and passes through the pipeline aligner 62, the pipeline straightener 58 and the pipeline tensioner 60 in route to the opening 54 in the pipe-laying vessel 50.

As noted above, in one illustrative embodiment, the pipeline system 11 may also comprise one or more of the above-described utility lines 15 that are positioned on or wrapped around a separate utilities reel 66. The utilities reel 66 is also mechanically supported on the vessel 50 by various support structures (not shown). In the illustrative example where the utility lines 15 comprises one or more of the liquid (e.g., chemical) supply lines 32 with the associated fluid tapping support blocks 70, the utility lines 15 may be wrapped around the utilities reel 66 in a manner similar to that described below with respect to the wrapping of the pipeline 12 around the pipeline reel 64. In one particularly illustrative embodiment, all of the utility lines 15 (including those with the associated fluid tapping support blocks 70) that will be attached or coupled to the pipeline 12 (via strapping) are wrapped around a single utilities reel 66. In other applications, a separate fluid-carrying utilities reel (not shown) may be provided so as to allow the wrapping of any or all of the fluid-carrying utility lines 32 (with the associated fluid tapping support blocks 70) around this separate fluid-carrying utilities reel. Of course, as will be understood by those skilled in the art after a complete reading of the present application, any number of loaded pipeline reels 64 (with the pipeline 12 that includes a plurality of access node structures 14X) may be positioned on the pipe-laying vessel 50. After a first of the loaded pipeline reels 64 is "emptied" by deploying the pipeline 12 (that includes a plurality of access node structures 14X) into the water 52, additional pipeline 12 (that includes a plurality of access node structures 14X) from a second loaded pipeline reel 64 may be welded to the end of the previously deployed pipeline 12 so as to permit substantially continuous introduction of the pipeline 12 into the water 52 via the opening 54.

As noted above, in one illustrative example, the pipeline system 11 may comprise one or more utility lines 15 that are adapted to be coupled to the pipeline 12 (that includes a plurality of access node structures 14X) prior to deploying the combination of the pipeline 12 and the one or more utility lines 15 into the water 52 via the opening 54 in the vessel 50. In one illustrative embodiment, after the pipeline 12 (that includes a plurality of access node structures 14X) exits the pipeline tensioner 60, workers on board the pipe-laying vessel 50 position or guide one or more of the utility lines 15 from the separate utilities reel 66 into the openings or slots 38A in one or more of the above-described utilities support blocks 38 that have been positioned around or adjacent an exterior surface of the pipeline 12. After positioning the utility lines 15 in the slots 38A, workers on board the vessel 50 strap the utilities support blocks 38 into position at one of the utilities attachment locations 41 along the pipeline 12 by wrapping the above-described strap 40 around the utilities support blocks 38 so as to insure that the utility lines 15 are "trapped" or maintained within the open-ended slots 38A within the utilities support blocks 38.

In another illustrative embodiment wherein the utility lines 15 that are to be attached to the pipeline 12 comprise one or more liquid-carrying utility lines 15 (such as the chemical line 32), workers on board the vessel 50 may also attach the above-described fluid tapping support blocks 70 to the pipeline 12 at fluid tapping attachment locations 43 by strapping the fluid tapping support blocks 70 (with the liquid-carrying utility line 15 welded into position therein) around the pipeline 12. In one embodiment, all of the utility lines 15 (including the liquid-carrying utility line 32) are positioned on the same utilities reel 66. In other applications, due to the presence of the fluid tapping support blocks 70 on the liquid-carrying utility line 32, the liquid-carrying utility line 32 may be wrapped around a separate reel (not shown). In one illustrative embodiment, after the pipeline 12 (that includes a plurality of access node structures 14X) exits the pipeline tensioner 60, workers on board the pipe-laying vessel 50 position or guide one or more of the liquid-carrying utility lines 15 (such as the chemical line 32) from the separate utilities reel 66 (or another separate reel) adjacent an exterior surface of the pipeline 12 and thereafter strap or secure the fluid tapping support blocks 70 into position at one of the fluid tapping attachment locations 43 along the pipeline 12 by wrapping the above-described strap 40 around the fluid tapping support blocks 70. At that point, workers on board the pipe-laying vessel 50 may install the above-described externally threaded tapping structure 80 in its initial, non-penetrating position within the tapped opening 76 in the fluid tapping support block 70. At that point, in this illustrative embodiment, the illustrative pipeline system 11 comprised of the combination of the pipeline 12 (that includes a plurality of access node structures 14X), the utility lines 15 installed in the utilities support blocks 38 (as strapped to the pipeline 12) and the liquid-carrying utility line 15 positioned within the fluid tapping support blocks 70 (as strapped to the pipeline 12) are deployed as a single unit into the water 52 via the opening 54 in the pipe-laying vessel 50.

Of course, as will be appreciated by those skilled in the art after a complete reading of the present application, in another illustrative embodiment, the access node structures 14X may be omitted from the pipeline system 11, and only the utility lines 15 may be attached to the pipeline 12 as it is deployed subsea.

Figure 9:
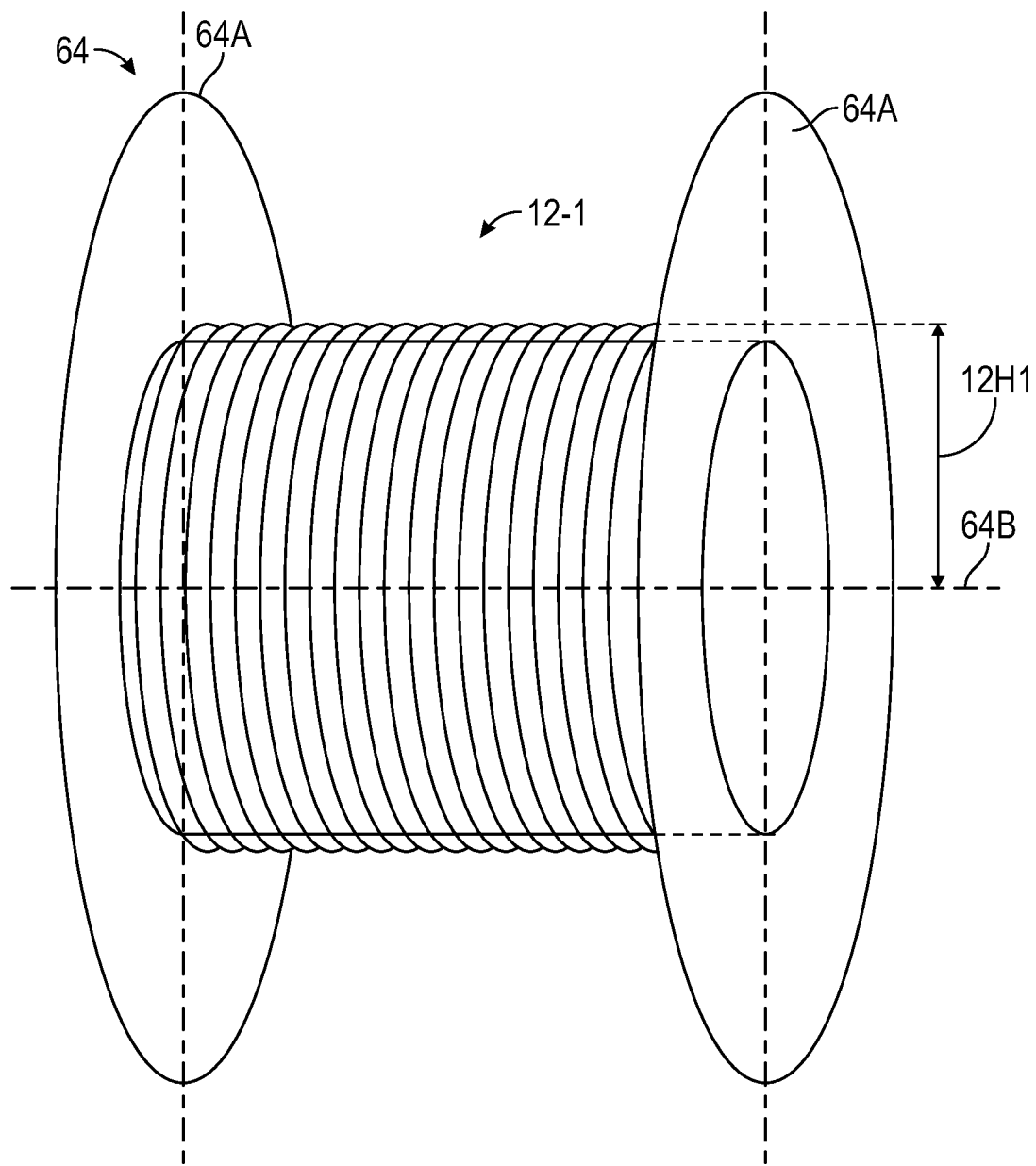
FIGS. 9-12 depict various illustrative examples of how embodiments of the pipelines disclosed herein may be wrapped around a pipeline reel or a pipe-laying vessel.

FIGS. 9-12 depict various illustrative examples of how the continuous pipeline 12 (that includes a plurality of illustrative access node structures 14X, such as the illustrative tapping structures 20) may be wrapped around the pipeline reel 64. The pipeline reel 64 comprises flanges 64A and the reel has a diameter of about 54 m. FIG. 9 depicts the pipeline system 11 at a point in time wherein an initial section 12-1 of the pipeline 12, a section without the access node structures 14X, i.e., a "clean" section of the pipeline 12, has been wrapped around the pipeline reel 64 so as to define a first layer of the pipeline 12. As depicted, the first layer 12-1 of the pipeline 12 is substantially uniformly positioned around the reel 64 both in terms of lateral spacing (if any) between the laterally adjacent portion of the wrapped pipeline 12 as well as the height 12H1 (or radial distance) of the outermost surfaces of the portions of the pipeline 12 in this first layer 12-1 of wrapped pipeline 12 relative to a centerline 64B of the pipeline reel 64.

Figure 10:
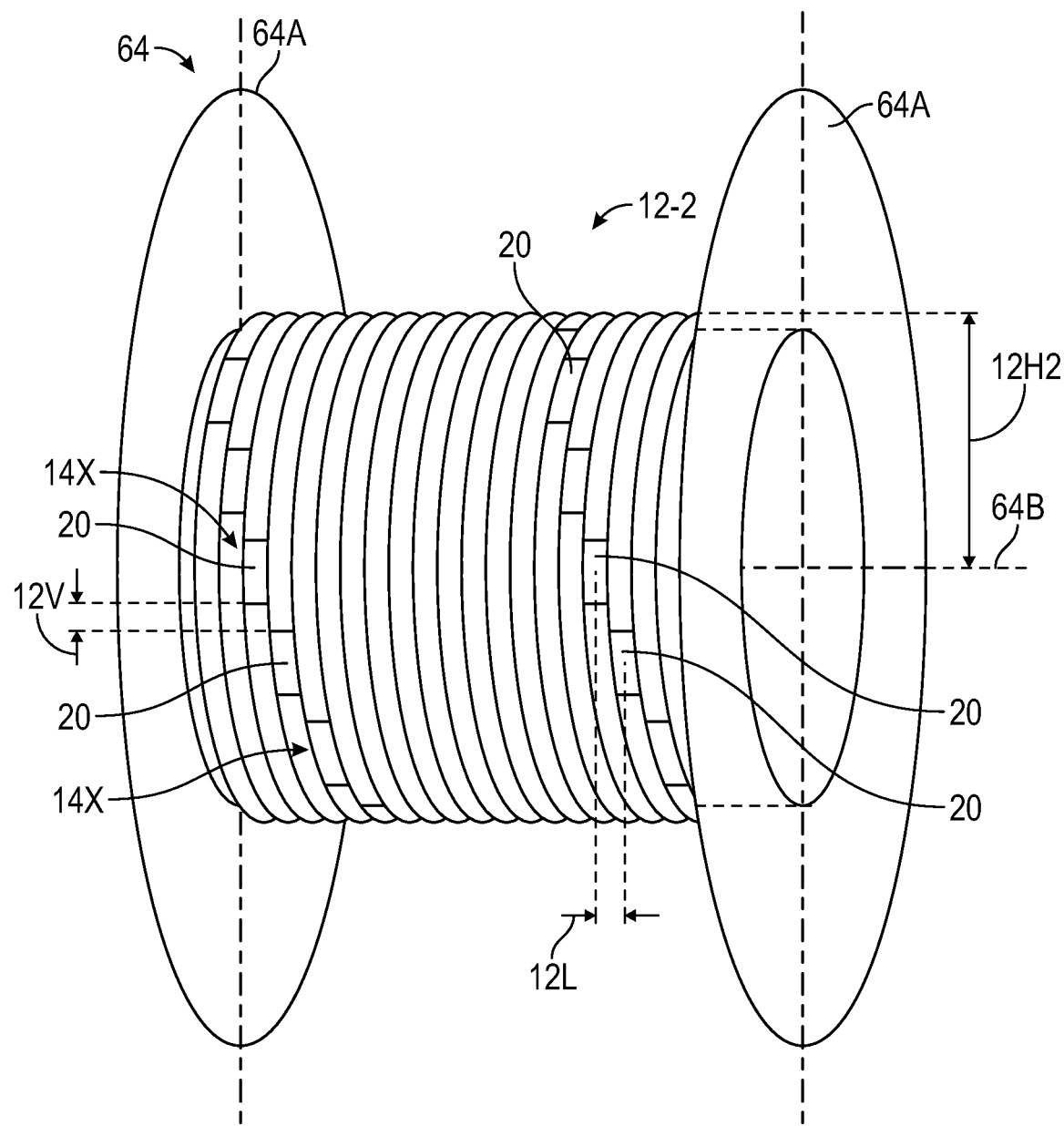

FIG. 10 depicts the pipeline system 11 at a point in time wherein another section of the pipeline, a section that includes a plurality of the illustrative tapping structures 20, has been wrapped around the pipeline reel 64 so as to define a second layer 12-2 of the pipeline 12. As depicted, the second layer 12-2 of the pipeline 12 is substantially uniformly positioned around the reel 64 in terms of lateral spacing (if any) between the laterally adjacent portions of the wrapped pipeline section 12-2. The outer surfaces of the portions of the second layer 12-2 of the pipeline 12 that do not include any of the tapping structures 20 are also located a substantially uniform height or radial distance 12H2 from the centerline 64B of the pipeline reel 64. As depicted, in this illustrative example, the centerlines of the tapping structures 20 on adjacent wraps of the second layer 12-2 of the pipeline 12 are laterally offset from one another (as indicated by the dimension 12L) and vertically offset from one another on adjacent wraps of the pipeline section 12-2 (as indicated by the dimension 12V). The magnitude of the dimensions 12L, 12V may vary depending upon the particular application. In one illustrative example, where the nominal diameter of the pipe of the pipeline 12 has a diameter of about 150-450 mm, the second layer 12-2 of the pipeline 12 comprises eighteen of the tapping structures 20 that are axially spaced apart from one another along the pipeline 12 by about 50 m. Additional sections of pipeline 12 (not shown) that comprise the tapping structures 20 may be wrapped around the reel 64 on top of the section 12-2. If needed, a steel cover (not shown) may be provided between the wrapped layers of the pipeline 12 that comprise the tapping structures 20 to smooth out the "bumps" in the reeled pipeline 12 due to the presence of the tapping structures 20. In some cases, the very outermost sections of the pipeline 12 wrapped on the reel may be clean portions of the pipeline that do not include any tapping structures 20.

Figure 11:
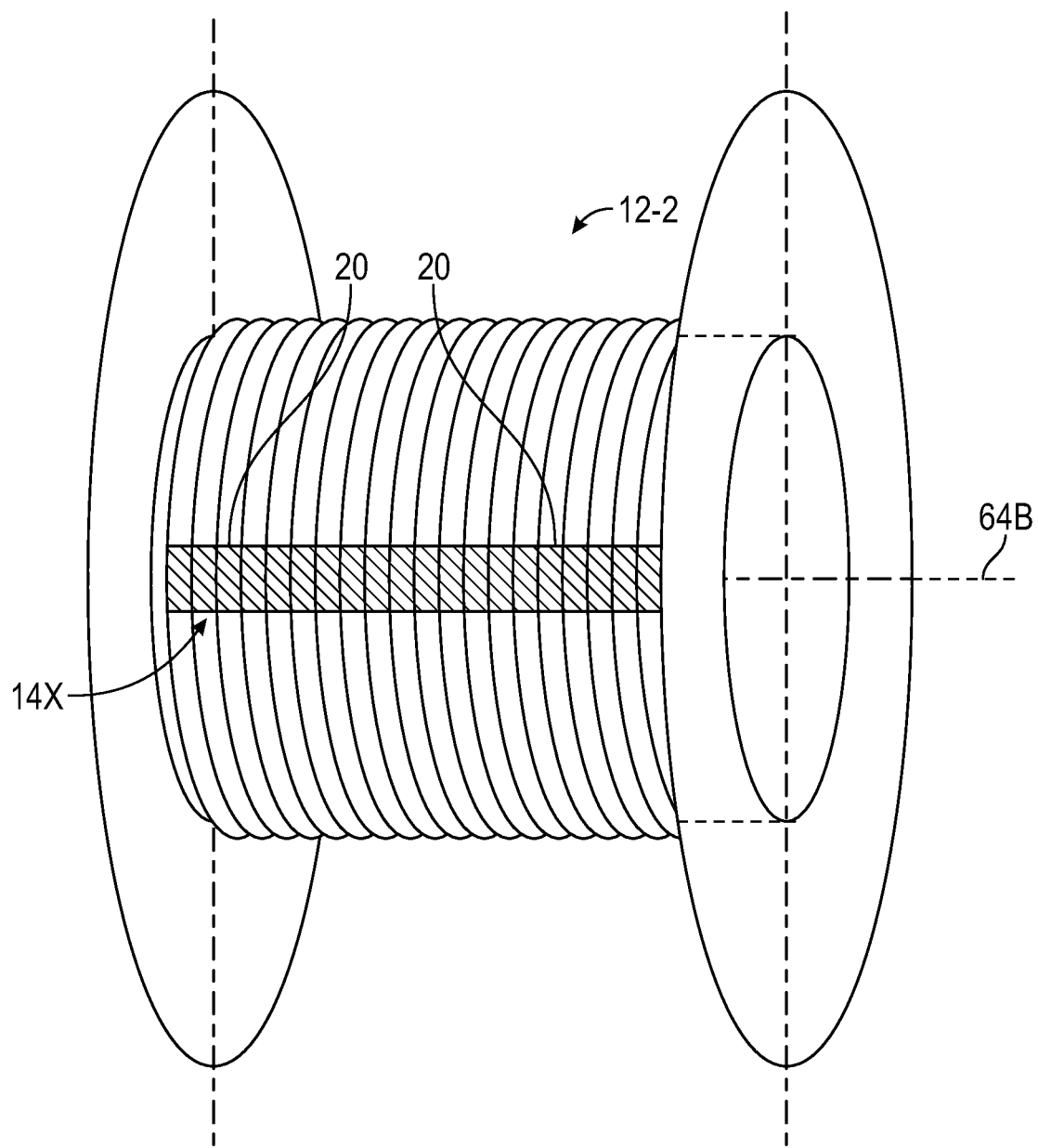
Figure 12:
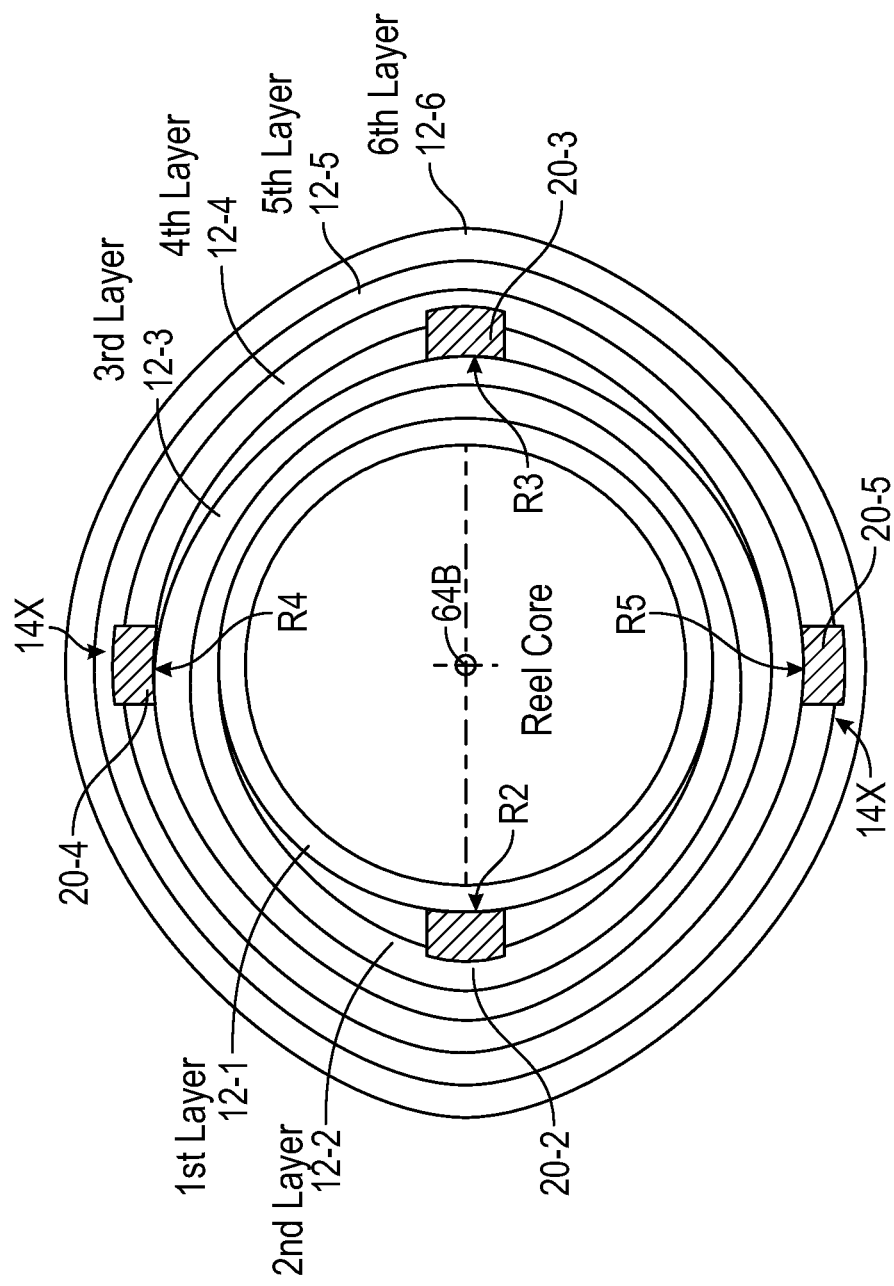

FIGS. 11 and 12 depict an embodiment wherein the axial spacing of the access node structures 14X, such as the illustrative tapping structures 20, along the pipeline 12 is approximately the same as the reeling diameter, e.g., the outer diameter of all of the previous sections of pipeline wrapped around the reel 66. As shown in FIG. 11, by taking this approach, the tapping structures 20 are positioned in a substantially continuous line or battery that is approximately parallel to the axis of the pipeline reel 64. More specifically, FIG. 12 depicts an embodiment wherein second layer 12-2 of the pipeline 12 includes a plurality of the tapping structures 20 that have an axial spacing along the pipeline of about 53.2 m. The first section of pipeline (not shown in FIG. 11) is free of the tapping structures 20. FIG. 12 is a side view of the wrapped pipeline 12 with the flanges 64A on the reel 64 removed after the reel 64 has been completely filled. The wrapped pipeline 12 comprises six wrapped sections 12-1 (the innermost section), 12-2, 12-3, 12-4, 12-5 and 12-6 (the outermost section). The sections 12-1 and 12-6 are clean sections of the pipeline 12 that are free of the tapping structures 20. Each of the pipeline sections 12-2, 12-3, 12-4 and 12-5 comprise a plurality of the tapping structures 20. The plurality of the tapping structures 20 in the sections 12-2, 12-3, 12-4 and 12-5 define lines 20-2, 20-3, 20-4 and 20-5, respectively, of tapping structures 20 that are oriented substantially parallel to the centerline 64B of the pipeline reel 64. As indicated, the lines 20-2, 20-3, 20-4 and 20-5 of tapping structures 20 are positioned at increasing larger radial distances R2, R3, R4 and R5, respectively, from the centerline 64. Also note that the lines 20-2, 20-3, 20-4 and 20-5 of tapping structures 20 are angularly spaced from one another around the reel 64 by approximately 90 degrees. In one illustrative example, where the nominal diameter of the pipe of the pipeline 12 has a diameter of about 150-450 mm, the second section 12-2 of the pipeline 12 comprises eighteen of the tapping structures 20 that are axially spaced apart from one another along the pipeline 12 by about 53.2 m; the third section 12-3 comprises eighteen of the tapping structures 20 with an axial spacing along the pipeline of about 54 m; the fourth section 12-4 comprises eighteen of the tapping structures 20 with an axial spacing along the pipeline of about 54.7 m; and the fifth section 12-5 comprises eighteen of the tapping structures 20 with an axial spacing along the pipeline of about 55.5 m.

FIGS. 13-22 depict one illustrative method disclosed herein wherein the access node structure 14X is comprised of the above-described tapping structure 20 that is adapted for tapping (hot or cold) the pipeline 12 via one of the access nodes 14 on the pipeline 12 after the pipeline 12 was deployed subsea. In this example, the pipeline is wrapped with the thermal insulation material 26. Also note that various utility lines 15 that may, in some embodiments, also have been strapped to the pipeline 12 at the time of deployment are not depicted in these drawings.

Figure 13:
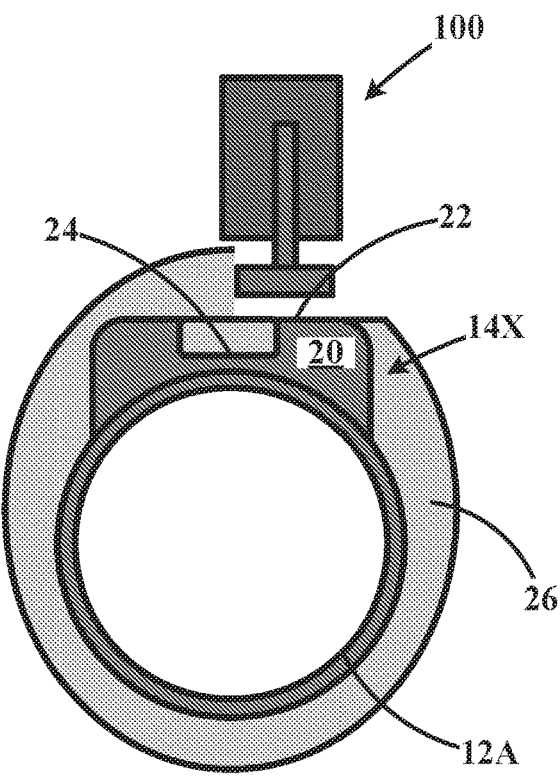

FIG. 13 depicts the use of a cutting tool 100 to remove a portion of the insulating material from above the tapping structure 20 at this particular access node 14. The cutting tool 100 may be positioned subsea and operated by use of an ROV (not shown). This process operation exposes at least the planar upper surface 22 of the tapping structure 20. Any residual insulation material 26 within the alignment/coupling recess 24 is also removed at this time.

Figure 14:
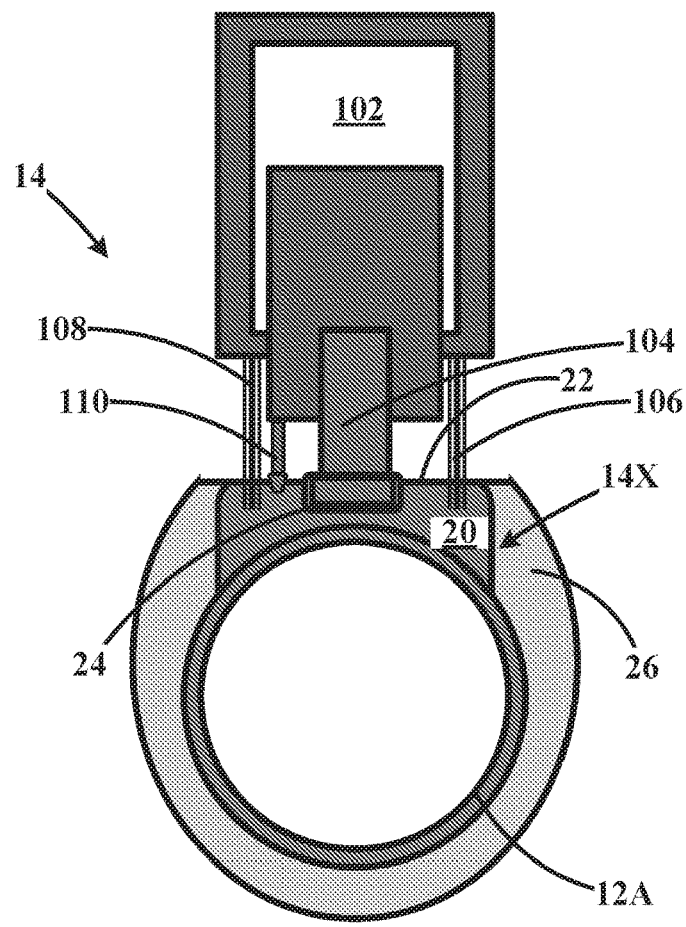

FIG. 14 depicts the pipeline 12 after a CNC machine tool 102 has been landed on the tapping structure 20 and secured in place. The tool 102 may be positioned subsea by use of one or more downlines with visual observation being provided by an ROV. The tool 102 comprises an alignment/clamping structure 104 that is adapted to be aligned with and positioned at least partially within the alignment/coupling recess 24 defined in the tapping structure 20. Once the tool 102 is properly positioned, expandable portions (not shown) of the alignment/clamping structure 104 are expanded outward so as to secure the CNC machine tool 102 to the tapping structure 20. Also depicted in FIG. 14 are tools 106, 108 that are adapted to drill and tap openings in the upper surface 22 of the tapping structure 20 so as to facilitate the later attachment of a valve (not shown in FIG. 14) as described more fully below. The tools 106, 108 are intended to be representative in nature of any kind of tooling necessary to drill and tap openings. Of course, the number and pattern of any such openings may vary depending upon the particular application. Also depicted in FIG. 14 is a tool 110 that is adapted to cut a seal recess into the upper surface 22. Note that the debris from performing these various machining operations may be readily cleaned from above the upper surface 22 as machining progresses. An ROV may be used to supervise and/or control all of the operations performed by the CNC machine tool 102.

Figure 15:
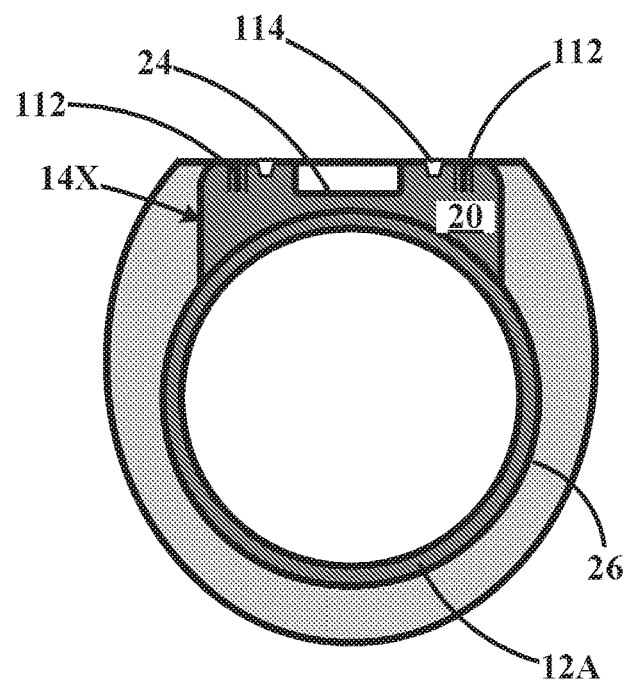

FIG. 15 depicts the pipeline 12 after the CNC machine tool 102 was operated to form simplistically depicted drilled and tapped openings 112 and a seal recess 114 in the tapping structure 20. At that point, the CNC machine tool 102 was retrieved to the surface.

Figure 16:
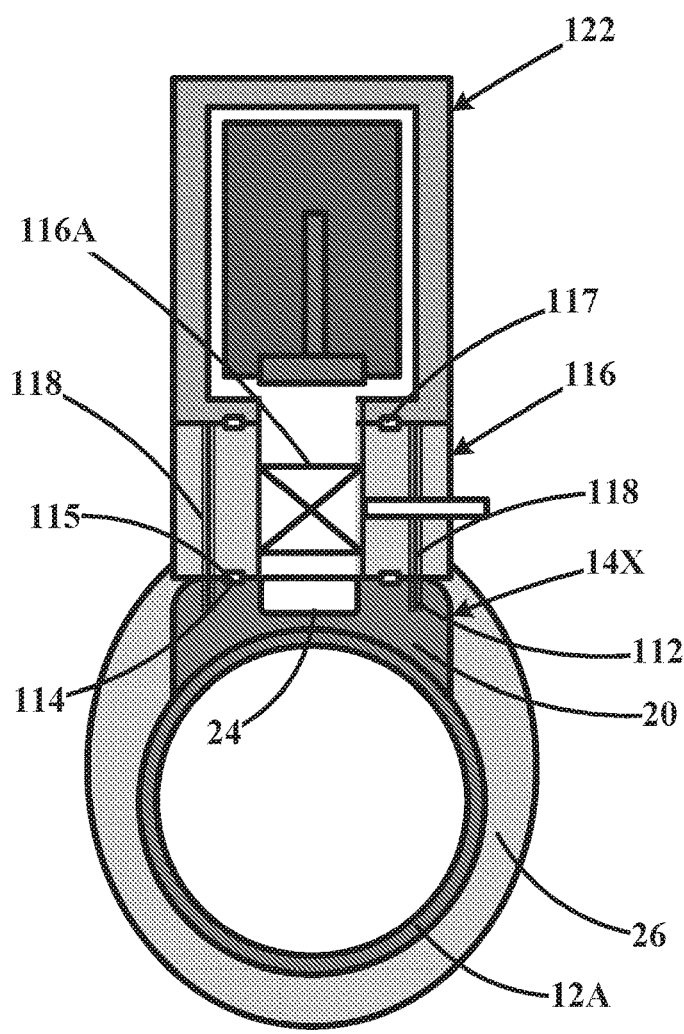

FIG. 16 depicts the pipeline 12 after a schematically depicted valve 116 and a schematically depicted pressure-containing tapping CNC machine tool 122 was attached to the tapping structure 20. The combination of the valve 116 and the tool 122 may be coupled together and run to the pipeline at the same time using a running tool (not shown) or by use of one or more downlines (not shown). Also depicted in FIG. 16 is an illustrative seal 115 positioned between the valve 116 and the tapping structure 20. The seal 115 is positioned in the previously formed seal recess 114. Also depicted is another seal 117 positioned between the CNC tool 122 and the valve 116. A plurality of simplistically depicted bolts 118 are adapted to engage the drilled and tapped openings 112 so as to secure the combination of the valve 116 and the tool 122 to the tapping structure 20. The valve 116 may be any type of valve that may, when opened, provide sufficient room to perform the machining process described below. In one illustrative example, the valve 116 may be a gate or a ball valve. FIG. 16 indicates the valve 116 in the open condition by virtue of the valve element 116A being non-shaded.

Figure 17:
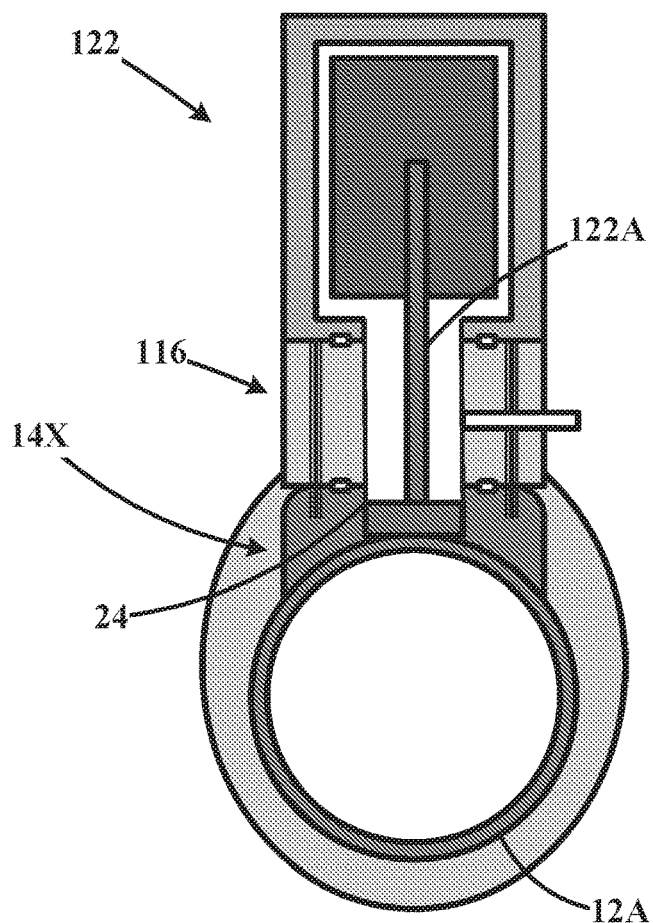

In FIG. 17 the valve element 116A has been omitted so as not to overly complicate the drawing. As shown in FIG. 17, a cutting tool 122A (e.g., a drill) of the tapping CNC machine tool 122 was extended through the open valve 116 until such time as it engaged the bottom of the alignment/coupling recess 24. At that time, the CNC machine tool 122 was operated to as to begin drilling through the tapping structure 20.

Figure 18:
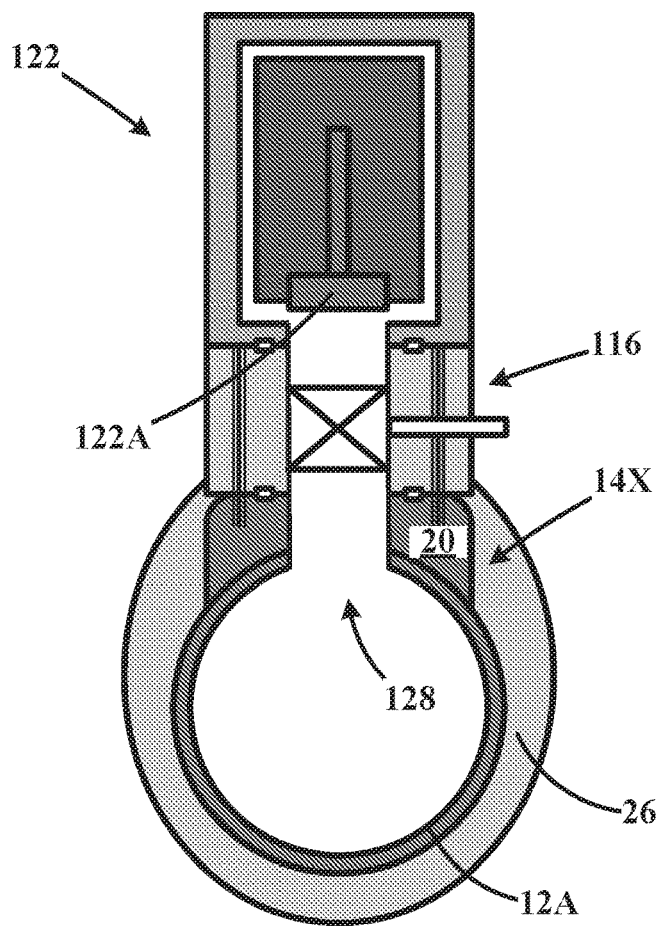

FIG. 18 depicts the pipeline 12 after several operations were performed. First, the CNC tool 122 continued drilling until such time as an opening 128 was defined in the tapping structure 20 and or the pipeline itself. The opening 128 provides fluid communication between the inside of the pipeline 12 and the valve 116. Thereafter, the cutting tool 122A was retracted through the open valve 116 and into the tool 122.

Figure 19:
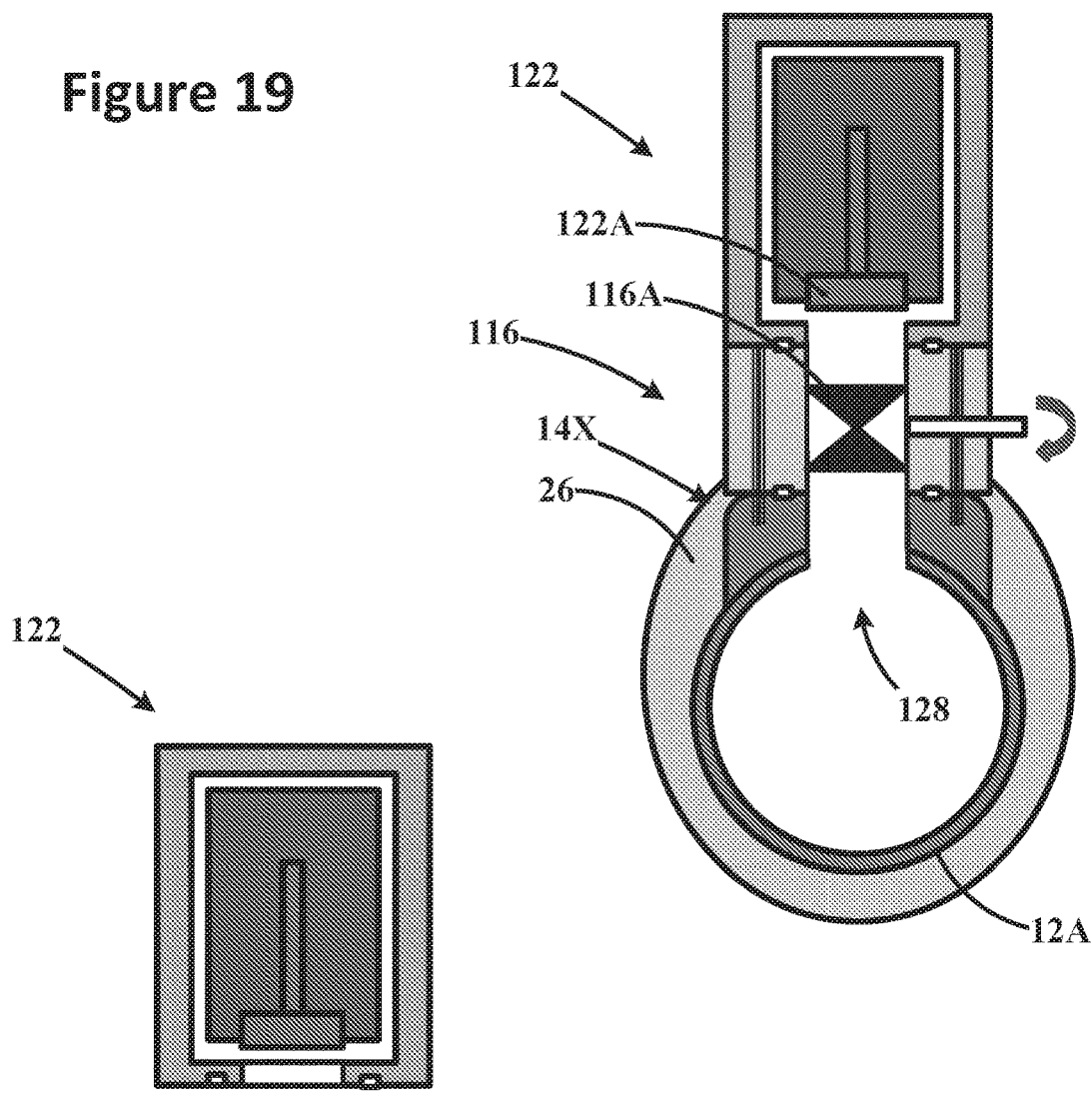

FIG. 19 depicts the pipeline 12 after the valve 116 was closed, as indicated by virtue of the valve element 116A being shaded.

Figure 20:
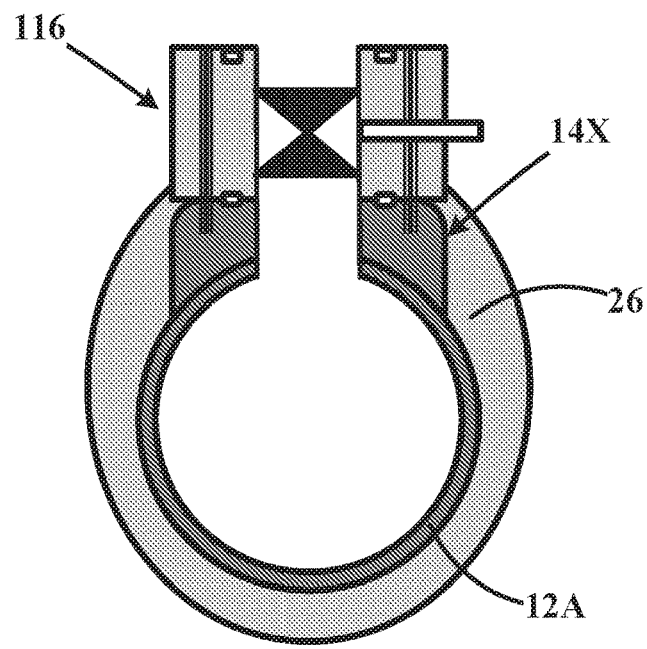

FIG. 20 depicts the pipeline 12 after the CNC tool 122 has been decoupled from the closed valve 116 and is in the process of being retrieved to the surface.

FIG. 21 depicts the pipeline 12 after an illustrative flowline 130 has been coupled to the closed valve 116.

FIG. 22 depicts the pipeline 12 after the valve 116 was opened thereby allowing establishing a fluid flow path, as indicated by the double arrow 132 between the flowline 130 and the pipeline 12. Fluids, such a production fluids, may flow from an item of subsea equipment, such as a production tree (not shown), into the flowline 130 and ultimately into the pipeline 12 and ultimately to a surface production facility.

FIGS. 23-30 depict one illustrative method of plugging the opening 128 on a permanent or temporary basis. Such plugging of the opening 128 may be required in several scenarios, e.g., the failure of the valve 116 during the initial installation process or for later repair of the valve 116. A plug may also be installed in the opening 128 as part of a permanent abandonment process operation.

FIG. 23 depicts the pipeline 12 after the valve 116 was closed so as to isolate the flowline 130.

FIG. 24 depicts the pipeline 12 after the flowline 130 was disconnected from the valve 116.

Figure 25:
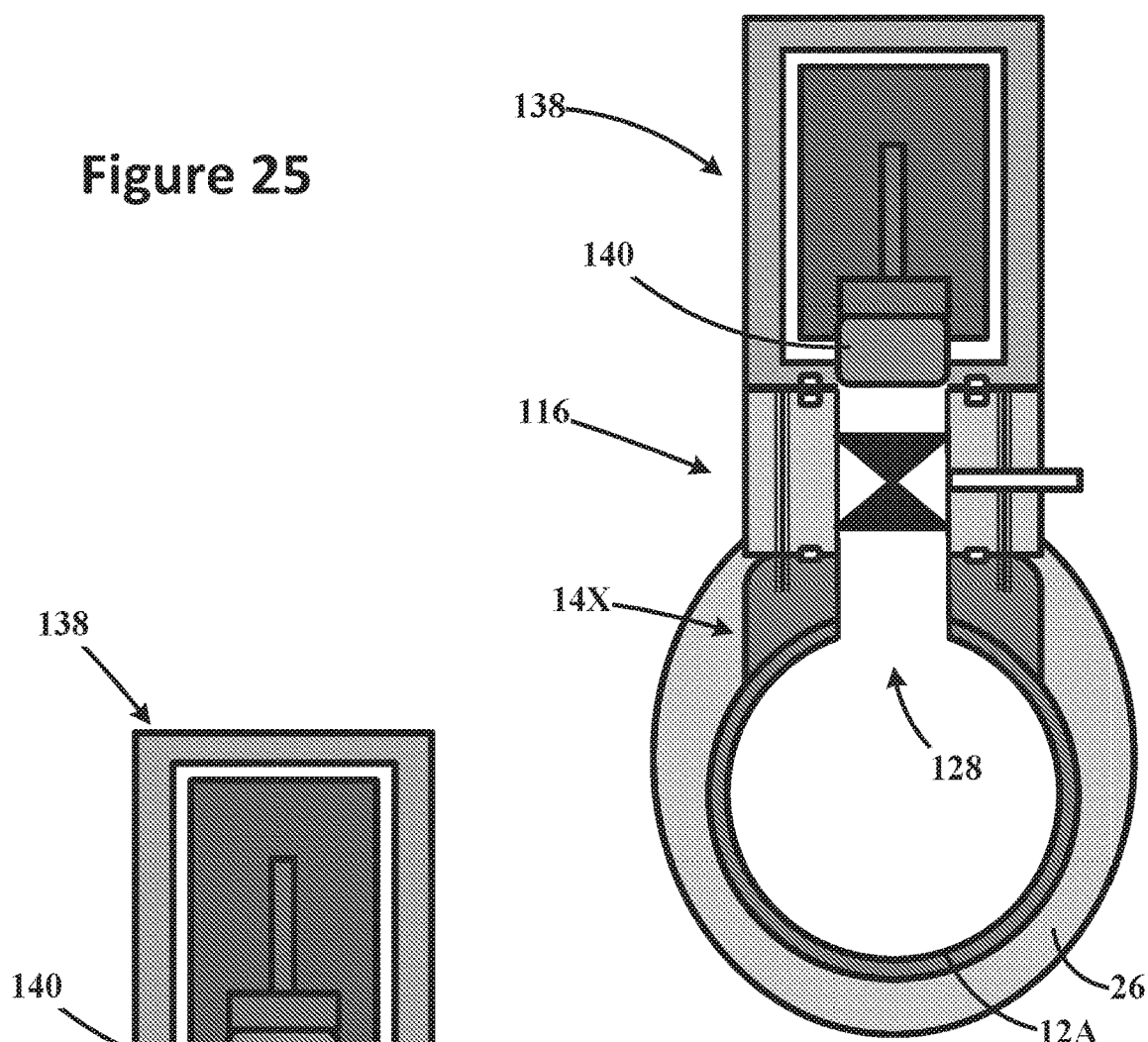

FIG. 25 depicts the pipeline 12 after a plug installation tool 138 was coupled to the closed valve 116. A variety of known plug installation tools may be employed for this process operation. Also depicted in FIG. 25 is a simplistically depicted plug 140.

Figure 26:
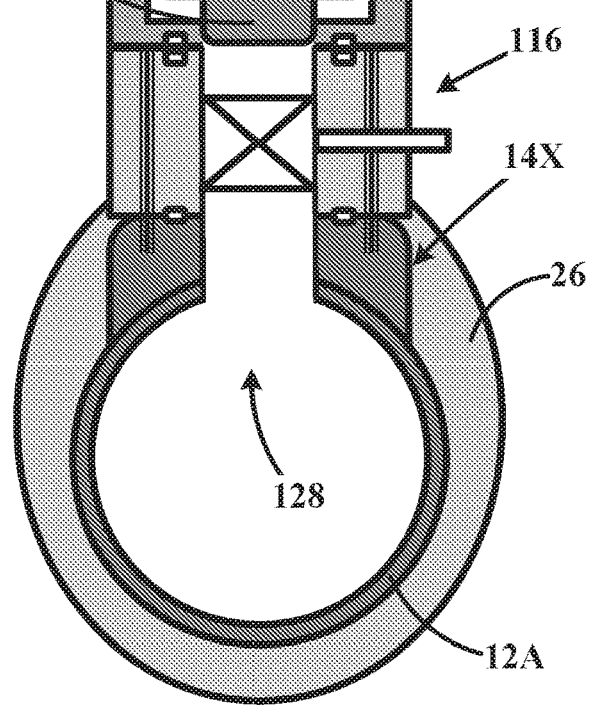

FIG. 26 depicts the pipeline 12 after the valve 116 was opened.

Figure 27:
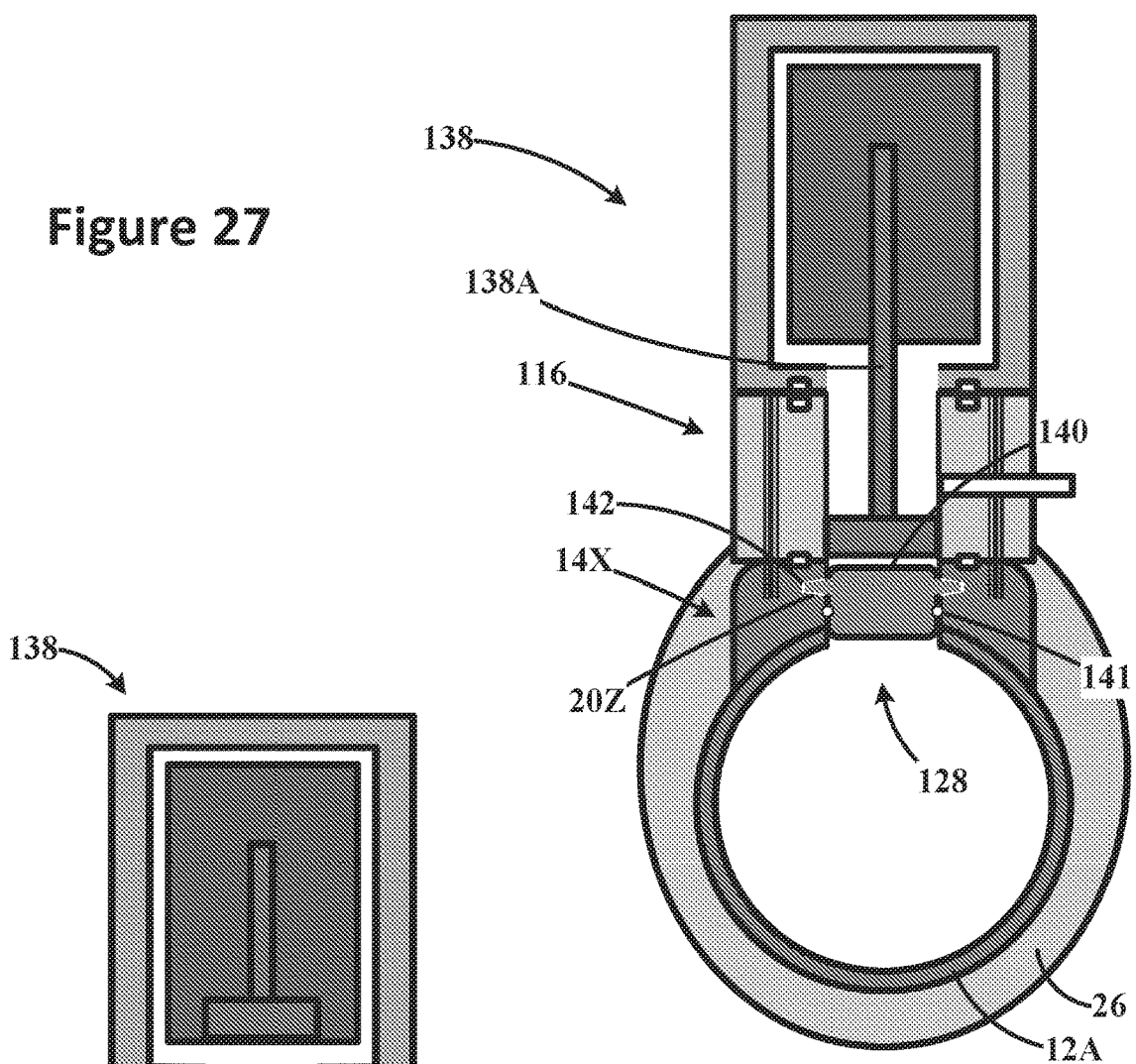

FIG. 27 depicts the pipeline after an arm 138A of the plug installation tool 138 was extended through the open valve 116 so as to position the plug 140 in its final sealed position within the portion of the opening 128 that extends through the tapping structure 20. The plug 140 comprises one or more seals 141 on its outer surface that are adapted to sealingly engage the inner surface of the portion of the opening 128 that extends through the tapping structure 20. At the time the CNC tool 122 was used to cut the opening 128 through the tapping structure 20, the tool 122 was also used to form a recess 20Z in the tapping structure 20. The recess 20Z is adapted to receive locking lugs 142 on the plug that may be actuated by the plug installation tool 138 so as to lock the plug 140 in its final sealed position within the tapping structure 20.

Figure 28:
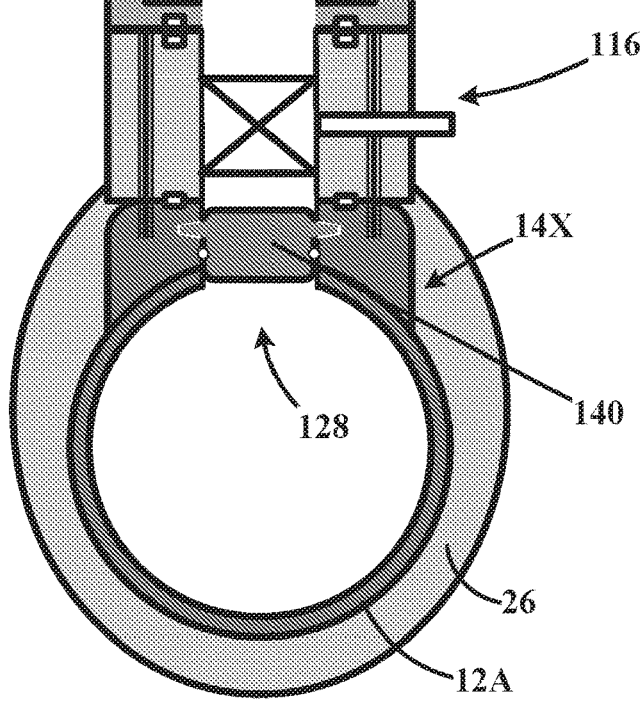

FIG. 28 depicts the pipeline 12 after the arm 138A of the plug installation tool 138 was retracted through the open valve 116 and into the tool 138.

Figure 29:
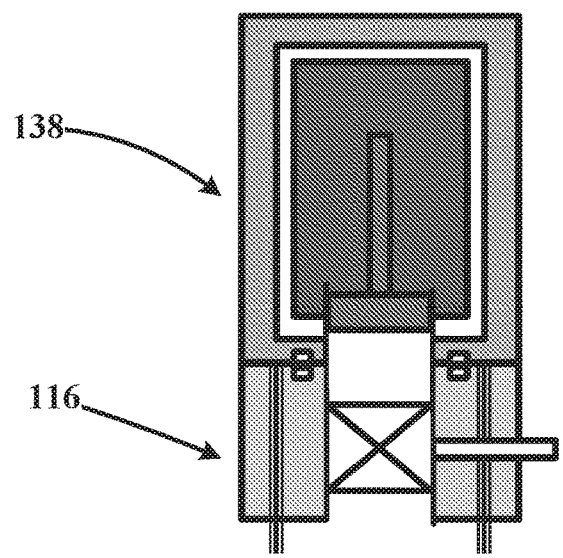

FIG. 29 depicts the pipeline 12 after the valve 116 was decoupled from the tapping structure 20 and the combination of the valve 116 and the tool 138 is in the process of being retrieved to the surface.

Figure 30:
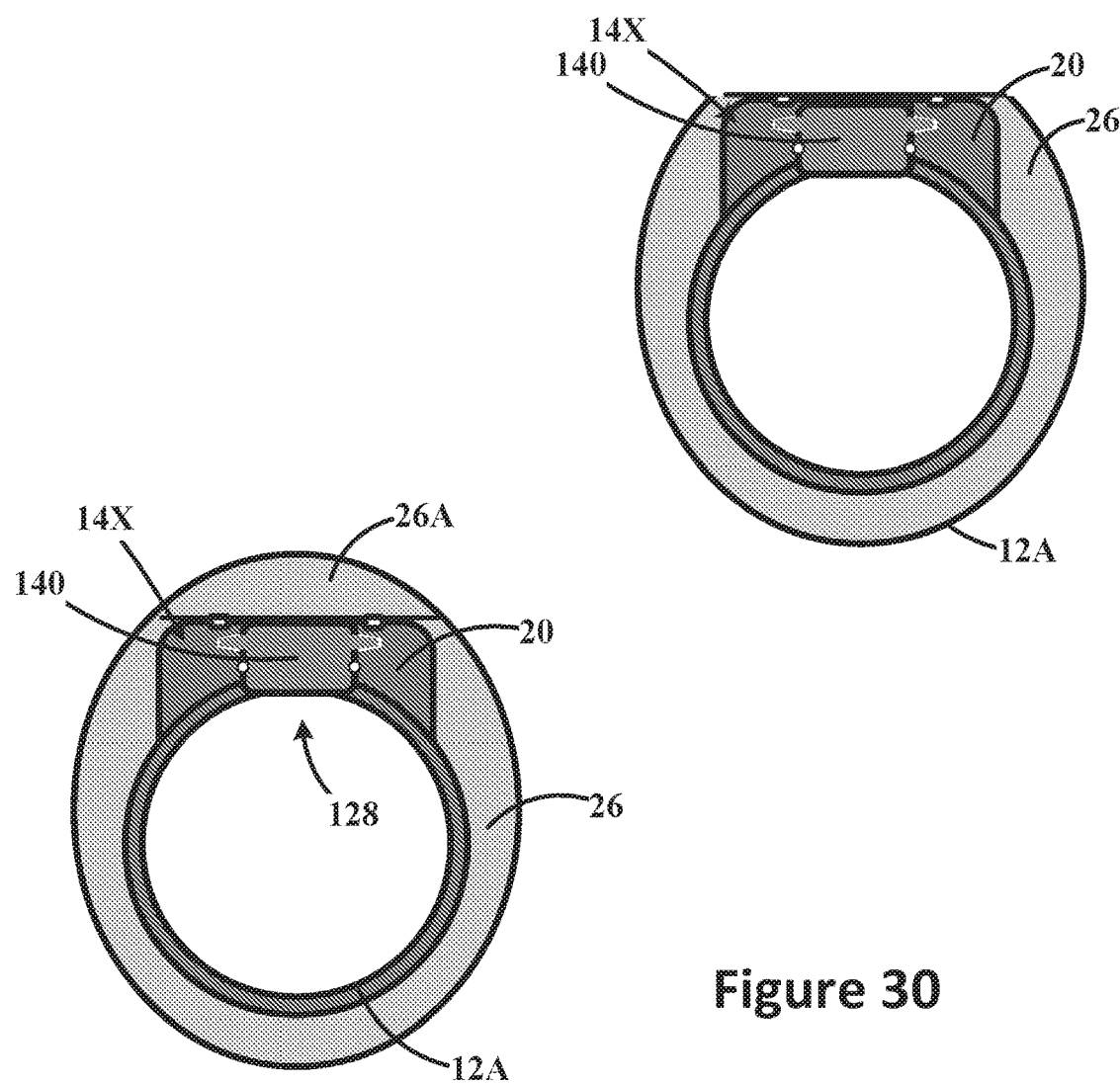

FIG. 30 depicts the pipeline 12 after additional insulation material 26 has been positioned on the pipeline above the tapping structure 20 with the plug positioned therein. To the extent access is ever again needed to the pipeline 12 via the opening 128, the valve 116 and the plug installation tool 138 may be re-attached to the tapping structure 20. The plug installation tool 138 may then be operated so as to retract the locking lugs 142 from engagement with the tapping structure 20 and the plug may be retrieved from the opening 128 within the tapping structure 20.

In another illustrative method disclosed herein, in the case where a plug has been previously installed in one of the access node structures 14X, the steps shown in FIGS. 23-30 could be performed in reverse order to remove the previously installed plug so as to provide fluid flow access to the pipeline 12 via the access node structure 14X.

Figure 31:
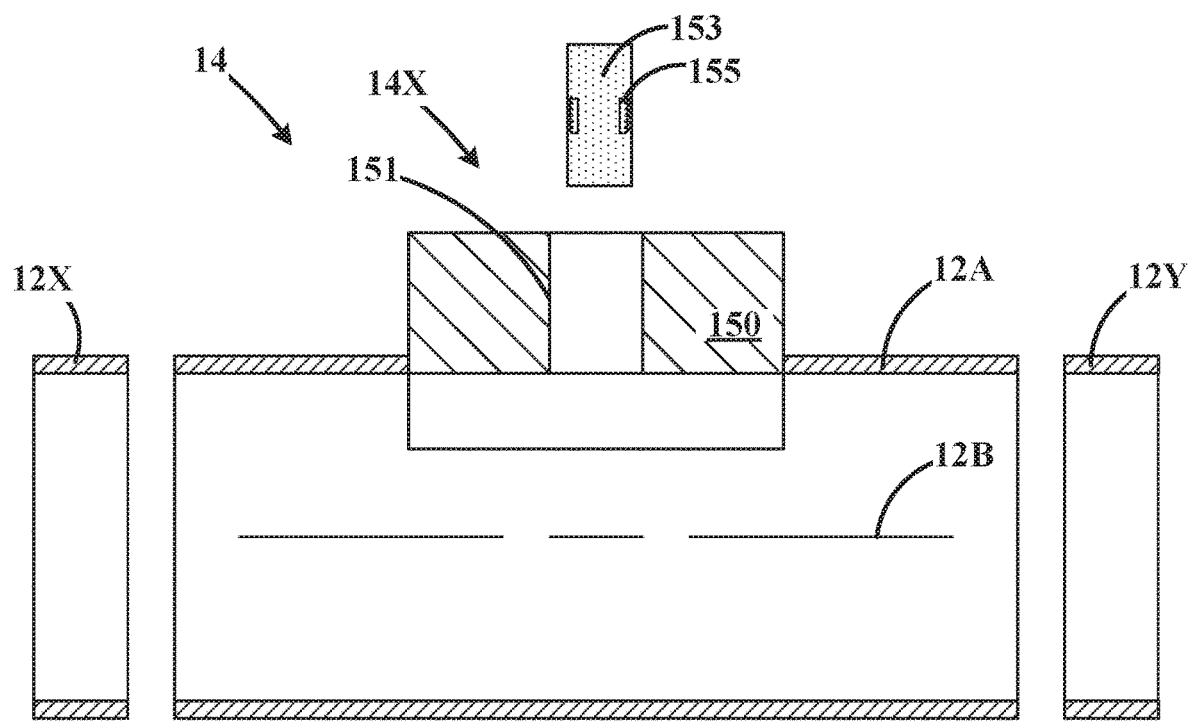
FIGS. 31-37 depict other illustrative embodiment of access node structures disclosed herein that may be employed on a subsea pipeline.
Figure 32:
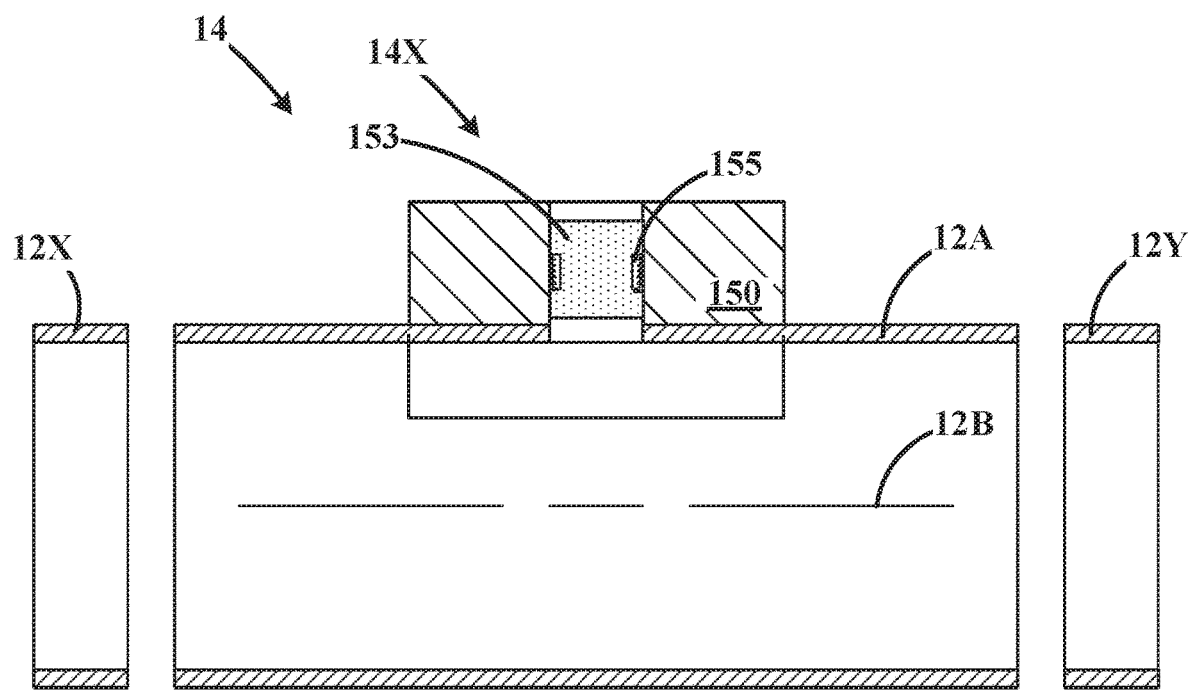

FIGS. 31 and 32 depict another illustrative embodiment of an access node structure 14X disclosed herein. More specifically, in this example, the access node structure 14X takes the form of a pressure-barrier retaining structure 150 that is adapted to receive a simplistically depicted removable pressure-barrier device 153. In general, the pressure barrier retaining structure 150 comprises an opening 151 that is exposed to the interior of the pipeline 12. As was the case with the previously described tapping structure 20, the pressure barrier retaining structure 150 may be formed integral with the pipeline 12. The pressure-barrier retaining structure 150 may be attached to the access node section of pipe 12A at an on-shore facility or it may be attached to the access node section of pipe 12A on a pipe-laying vessel as the pipeline 12 is being deployed. In one illustrative embodiment, the pressure-barrier retaining structure 150 may have approximately the same dimensions as that of the illustrative tapping structure 20 discussed above. In other applications, the pressure-barrier retaining structure 150 may be significantly smaller than the tapping structure 20 described above. The size of the opening 151 may vary depending upon the particular application. In the example depicted, only a single pressure-barrier device 153 will be positioned in the opening 151. However, if desired, the pressure-barrier retaining structure 150 could be made of sufficient size such that multiple pressure-barrier devices 153 could be positioned within the opening 151 to provide redundant pressure barriers. As will be appreciated by those skilled in the art after a complete reading of the present application, the pressure-barrier device 153 is intended to be representative of any type of pressure retaining device that may be positioned in an opening. With reference to FIG. 31, in one illustrative embodiment, the pressure-barrier device 153 may be a simplistically depicted removable plug that comprises one or more elastomeric sealing elements (not separately shown) and a plurality of anchor slips 155. Such plugs are commonly employed in various downhole operations such as, for example, fracturing operations. These types of plugs may be mechanically set in the opening 151. FIG. 31 depicts the plug 153 in the un-set condition, while FIG. 32 depicts the plug 153 in the set condition wherein the sealing elements of the plug 153 have been expanded to seal against the inner surface of the opening 151 and the anchor slips 155 have been extended so as to engage the inner surface of the opening 151. In other embodiments, the pressure-barrier device 153 may be what is generally known as a disappearing tubing hanger (or glass) plug. In this illustrative example, the pressure-barrier device 153 will be positioned in the opening 151 of the pressure-barrier retaining structure 150 and set so as to seal the opening 151 prior to the pipeline 12 being deployed into the sea. As noted above, at some point later in time, the pressure-barrier device 153 may be removed by using a device such as the above-mentioned plug installation/retrieval tool 138 and the valve 116. In the case where the need for access to the pipeline 12 is only temporary, another pressure-barrier device 153 may be re-installed in the opening 151 at the completion of the temporary process operation.

Figure 33:
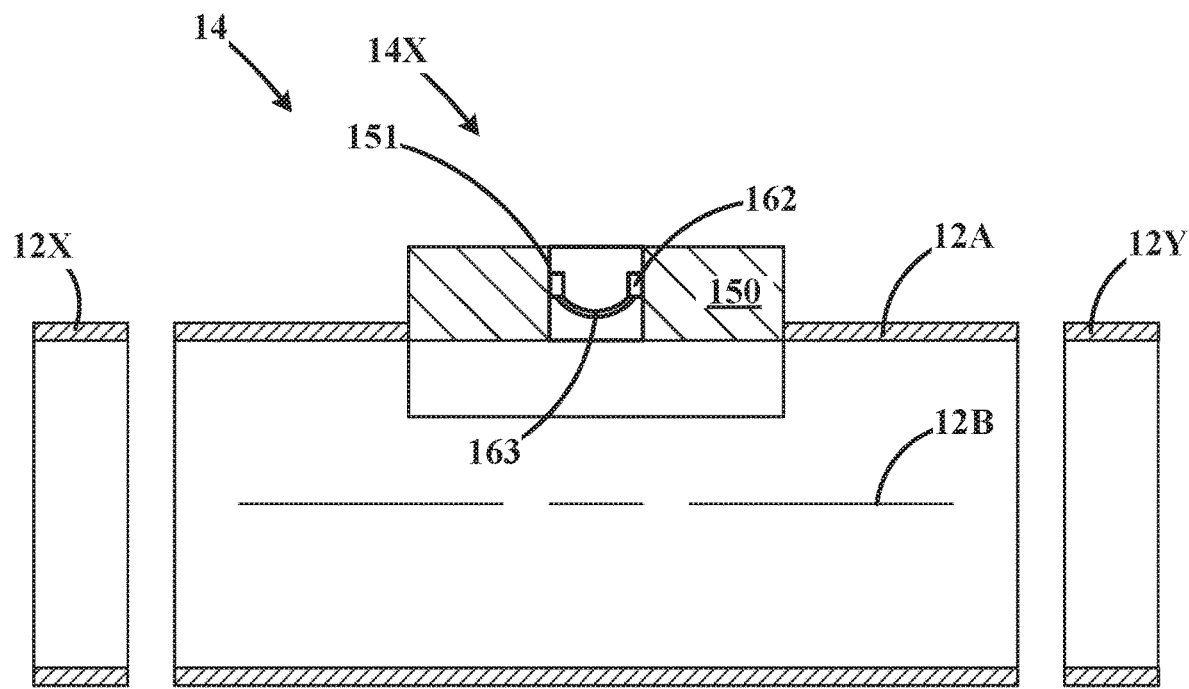
Figure 34:
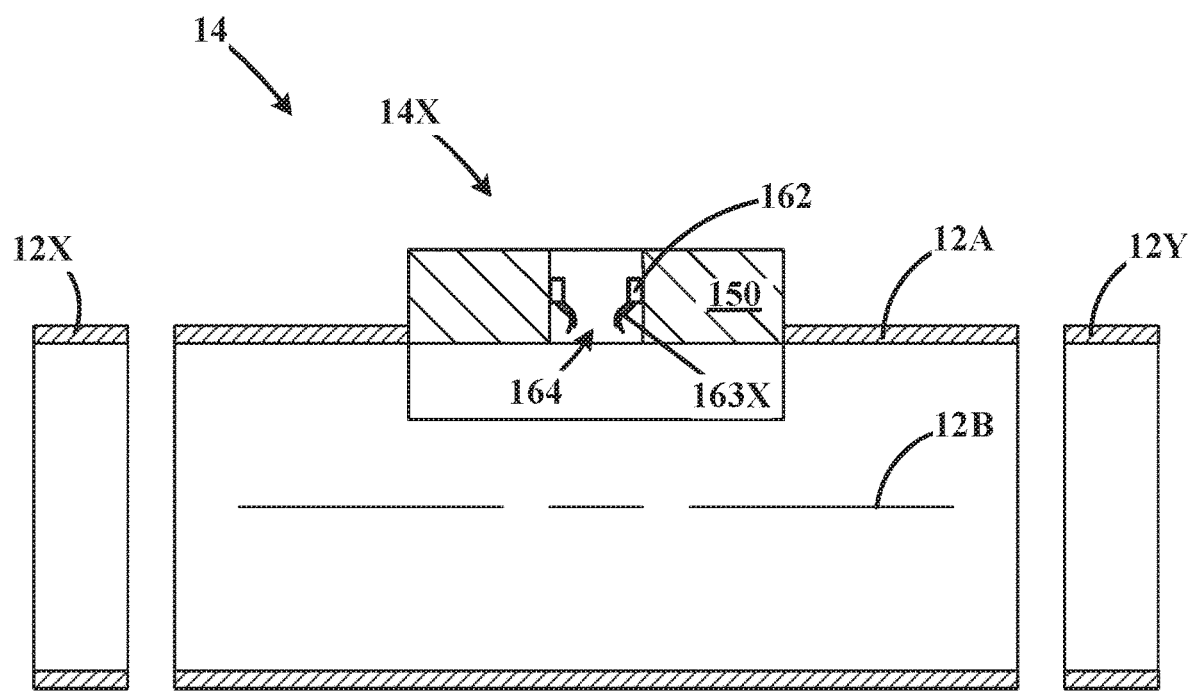

FIGS. 33 and 34 depict yet another illustrative embodiment of an access node structure 14X disclosed herein. More specifically, this example depicts one or more pressure barriers adapted to be positioned in the opening 151 of the pressure-barrier retaining structure 150. In the depicted example, the pressure barrier is a single bursting pressure-retaining device 162 positioned in the opening 151 of the pressure-barrier retaining structure 150. The device 162 comprise a membrane (or disc) 163 that is capable of being ruptured by increasing the pressure applied to the membrane 163 so as to gain fluid access to the interior of the pipeline 12. As noted above, if desired, the pressure-barrier retaining structure 150 could be made of sufficient size such that multiple pressure barriers, e.g., multiple bursting pressure-retaining devices 162, could be positioned within the opening 151 to provide redundant pressure barriers. In such a situation, access would be provided to the space between such multiple pressure barriers so as to monitor the pressure within the space between the multiple pressure barriers. FIG. 33 depicts the bursting pressure-retaining device 162 with the membrane 163 intact and the opening 151 sealed. FIG. 34 depicts the bursting pressure-retaining device 162 wherein the membrane 163 has been ruptured, thereby creating an opening 164 in the membrane 163 that allows access to the interior of the pipeline 12. In this illustrative example, the bursting pressure-retaining device 162 will be positioned in the opening 151 of the pressure-barrier retaining structure 150 so as to seal the opening 151 prior to the pipeline 12 being deployed into the sea. At some point later in time, the membrane 163 of the bursting pressure-retaining device 162 may be removed by attaching the valve 116 to the pressure-barrier retaining structure 150 and coupling the valve 116 to a source of fluid, typically a liquid. At that point, the valve may be opened and the pressure of the fluid may be increased until such time as the membrane 163 ruptures, thereby providing access to the pipeline 12. After the membrane 163 is ruptured, the bursting pressure-retaining device 162 may or may not be removed from the opening 151.

Figure 35:
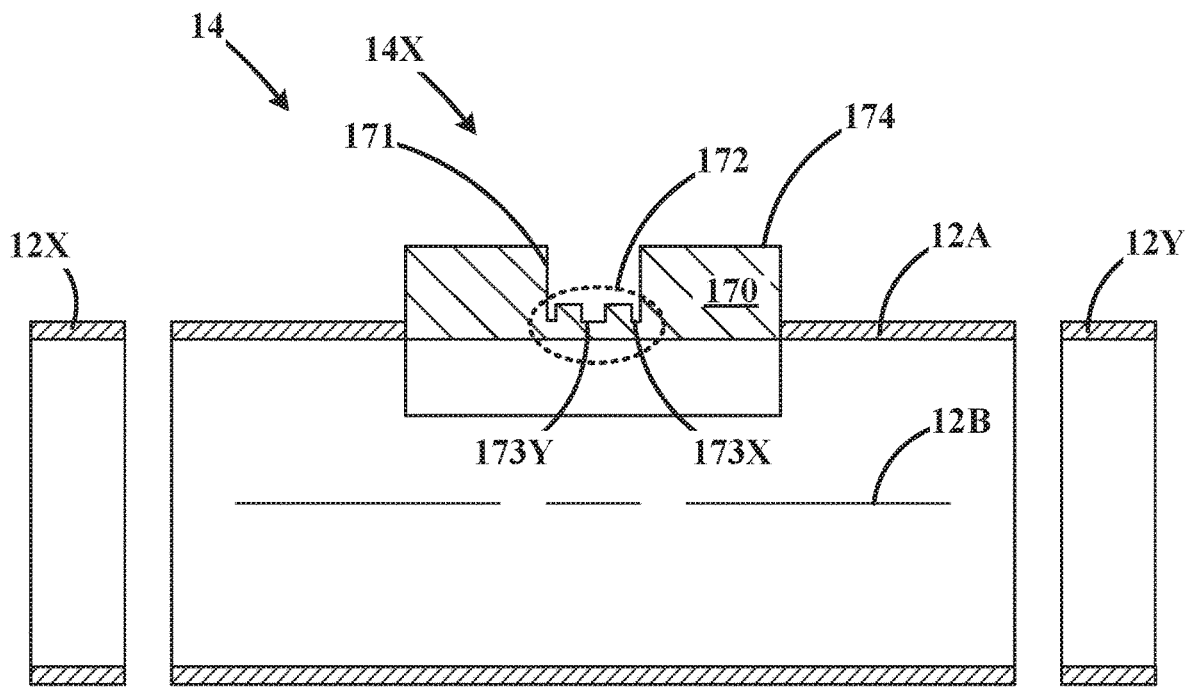
Figure 36:
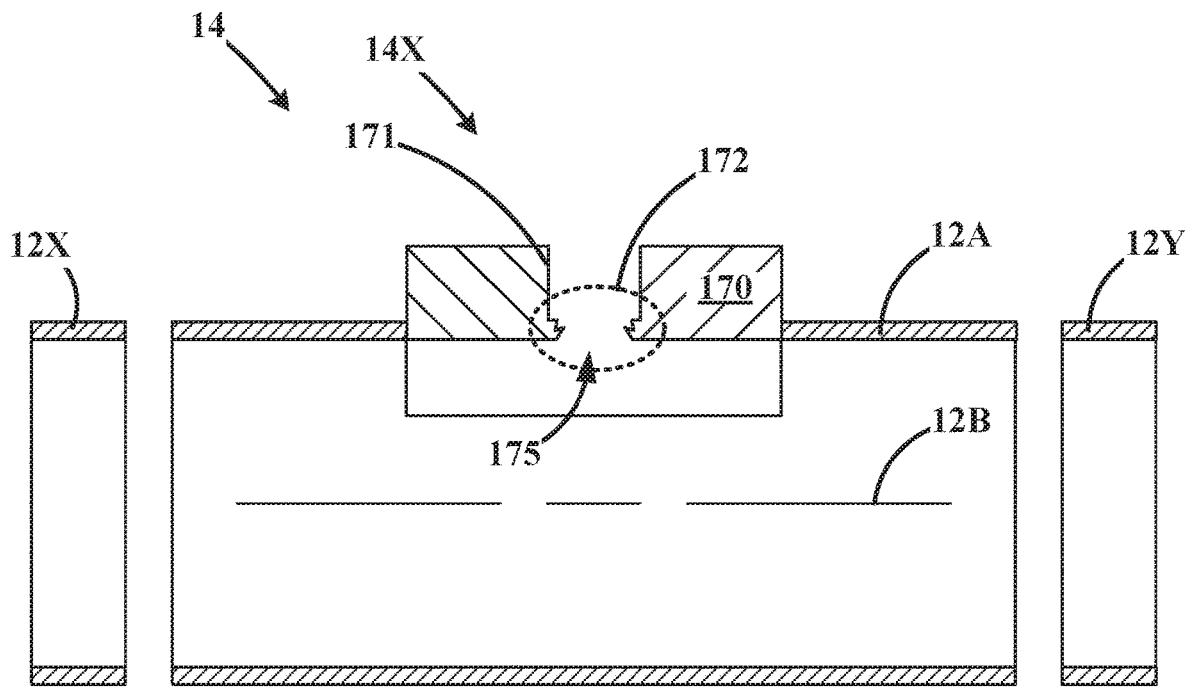
Figure 37:
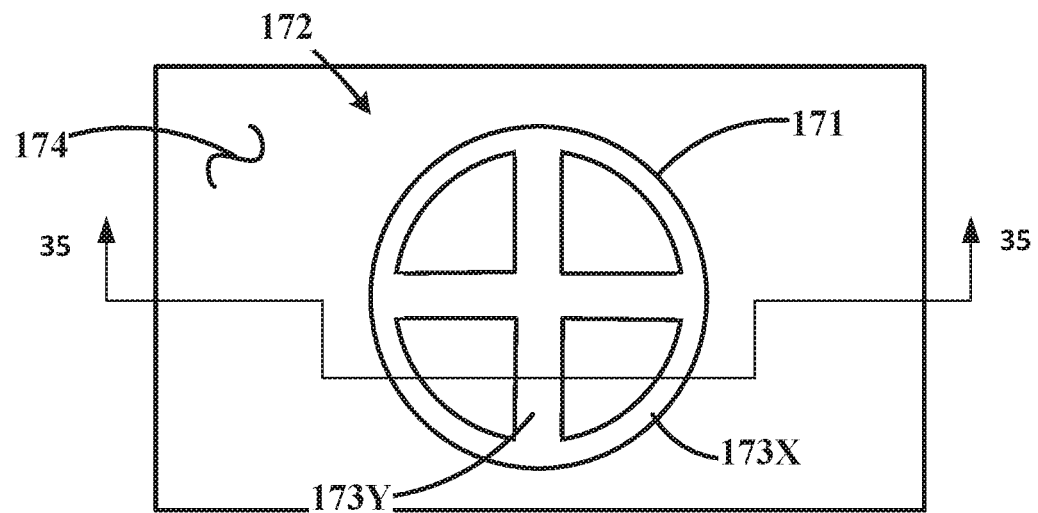

FIGS. 35, 36 and 37 depict yet another illustrative embodiment of an access node structure 14X disclosed herein. More specifically, in this example, the access node structure 14X takes the form of a pressure-barrier retaining structure 170 having a scored or notched bottom 172 with various grooves or notches that function as stress risers so as to permit all or portions of the bottom 172 to be removed so as to gain access to the pipeline 12. FIG. 35 is a side view of this embodiment of the access node structure 14X with the bottom 172 intact. FIG. 36 is a cross-sectional view of the pressure-barrier retaining structure 170 wherein portions of the bottom 172 have been mechanically removed, thereby forming an opening 175 that allows access to the pipeline 12. FIG. 37 is a plan view showing the bottom 172. FIG. 37 also indicates where the cross-sectional view of the bottom 172 shown in FIG. 35 is taken (the portion of the cross-sectional view in FIG. 35 that passes through bottom 172 is laterally from the centerline 12B of the pipe 12A). As shown in FIGS. 35 and 37, a plurality of grooves 173X and 173Y are formed in the bottom 172. The grooves 173X, 173Y may be of any desired shape or configuration. As noted above, these grooves 173X, 173Y are formed in the bottom 172 so that they act as stress risers that enable the removal of all or a portion of the bottom 172 by mechanical means so as to gain access to the interior of the pipeline 12. In general, the pressure barrier retaining structure 170 comprises recess 171 and the bottom 172. The thickness of the bottom 172 as well as the depth of the grooves 173X, 173Y are designed such that the bottom 172 can withstand all loads applied to the bottom 172 during installation, commissioning, operation and abandonment of the pipeline 12. As was the case with the previously described tapping structure 20, the pressure barrier retaining structure 170 may be formed integral with the pipeline 12. The pressure-barrier retaining structure 170 may be attached to the access node section of pipe 12A at an on-shore facility or it may be attached to the access node section of pipe 12A on a pipe-laying vessel as the pipeline 12 is being deployed. In one illustrative embodiment, the pressure-barrier retaining structure 170 may have approximately the same dimensions as that of the pressure-barrier retaining structure 150 or the tapping structure 20. The size of the opening 171 may vary depending upon the particular application In this illustrative example, access node section of pipe 12A that contains the pressure-barrier retaining structure 170, with the notched bottom surface 172, will be positioned in the pipeline prior to the pipeline 12 being deployed into the sea. At some point later in time, all or part of the bottom 172 may be removed by using a hydraulic tearing device. This hydraulic tearing device could use hydraulic power to effectively push or pull on the notched or scored section to apply sufficient force to tear the material at the stress risers. In one illustrative embodiment, the hydraulic tearing device may comprise a hydraulic cylinder (similar to the hydraulic cylinder shown in FIG. 27) that is adapted to be extended so as to push on the notched bottom surface 172. In such an embodiment, a sloped face at the end of the piston rod may be provided so as to apply more force to one side of the notched bottom surface 172 to initiate the tear. As the rod continues to extend, the sloped face substantially completes the tear around the whole circumference of the notched bottom surface 172. In another embodiment, a pilot hole (not shown) may be drilled through the bottom surface and a pull-out device (not shown) would be positioned in or through the pilot hole such that it is securely attached to or cannot be readily withdrawn from the pilot hole. In one embodiment, the pull out device may be part of or an attachment to a rod of a hydraulic cylinder, wherein the rod is in an extended position. At that time, the hydraulic cylinder may be actuated so as to retract the rod, thereby mechanically tearing the bottom surface 172. In one particular embodiment, such a pilot hole may be drilled off-center so as to initiate the tear in an edge region of the bottom surface. After the initial tearing of the bottom surface 172, the hydraulic cylinder would be further retracted to complete the tearing around the entire circumference of the bottom surface 172. The hydraulic tearing device may be used in much the same manner as described above with respect to the tapping operations with the exception that a plug would not be set in the opening 175 after portions of the bottom 172 were removed.

As will be appreciated by those skilled in the art after a complete reading of the present application, any combination of the various access node structures 14X disclosed herein may be employed in a single pipeline 12. For example, a single pipeline may comprise a plurality of the tapping structures 20, a plurality of the pressure-barrier retaining structures 150 and/or a plurality of the pressure-barrier retaining structures 170. Of course, if desired, a single pipeline may only contain a plurality of the tapping structures 20. Thus, the presently disclosed subject matter provides great flexibility as it relates to ongoing field development activities and the manner in which access may be had to the pipeline via the access nodes 14.

Figure 38:
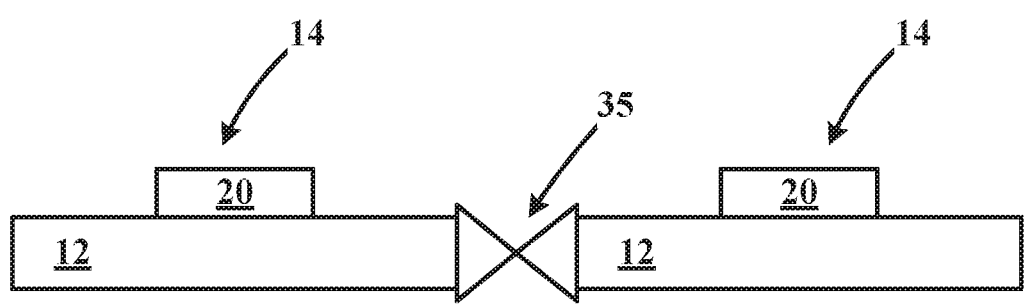
FIGS. 38-39 depict one illustrative example of the flexibility provided by use of various embodiments of a pipeline system disclosed herein.
Figure 39:
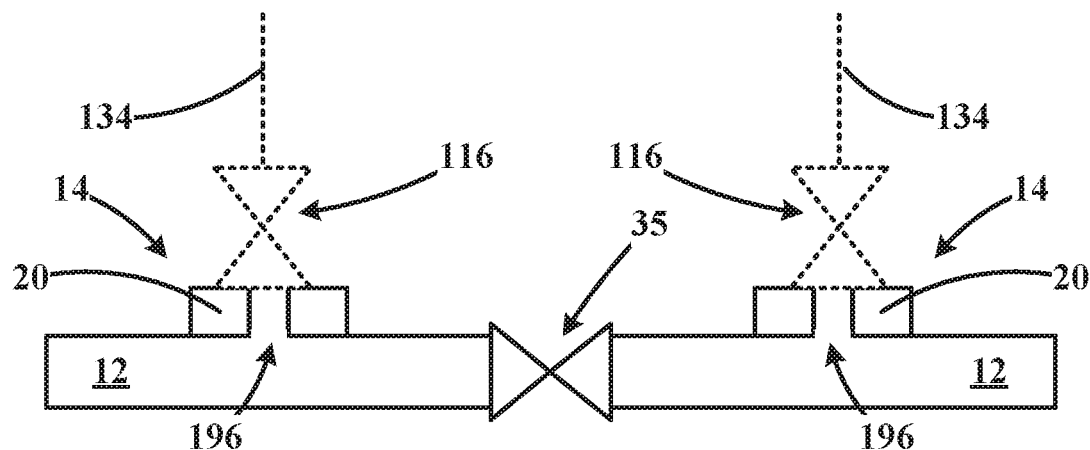

FIGS. 38-39 depict one illustrative example of the flexibility provided by use of various embodiments of the pipeline system disclosed herein. In some applications, it may be desirable or necessary to expand the functionality of the subsea production equipment that was previously installed above a reservoir. For example, in the early stages of the development of a reservoir 10, the production of hydrocarbon-containing fluid under the natural production forces of a well may be sufficient to make such a well commercially viable over a certain period of time. However, over time, the produced fluids from such a well may require the addition of extra energy to boost the flowrate of hydrocarbons. The hydrocarbon streams may be single phase, or a multiphase stream of hydrocarbon-containing fluids, i.e., a production stream that includes significant quantities of both liquid and gas hydrocarbon-containing materials. In that situation, it may be desirable to boost the energy of the fluids through the addition of further subsea processing equipment, which might include the addition of one or a combination of: a single phase pump, a multiphase pump, a separator, a compressor, etc. This is typically accomplished by adding the additional subsea processing equipment through a "tie-in" that provides fluid communication between the newly-added equipment and the pre-existing equipment, such as a subsea manifold. As the development of the reservoir 10 continues over time, it may be necessary to add further subsea equipment that serves to separate liquid and gas components of the overall produced fluid and pump the liquid portions of the produced fluid to further processing units. Such additional subsea equipment may need to be tied in to the preexisting items of equipment positioned subsea. At a further stage of the development of the reservoir 10, existing production equipment and/or newly added production equipment may be tasked with performing the additional function of reinjecting some of the separated liquid portions of the produced fluid back into a well drilled into the reservoir. All of these modified production processes that occur over the useful life of the reservoir 10 typically involve adding additional valves, flowlines and equipment so as to provide the necessary functionality for producing hydrocarbon-containing fluids from the reservoir 10 in commercially viable quantities.

FIG. 38 depicts an embodiment of an illustrative pipeline 12 disclosed herein that comprises previously un-tapped access nodes 14 spaced along the pipeline 12. As indicated, the original as-deployed pipeline 12 comprises an originally-installed valve 35. At some point in time after the initial deployment of the pipeline 12 into the sea, additional equipment subsea must be added so as to provide additional subsea process capabilities.

With reference to FIG. 39, using the illustrative tapping method disclosed herein, an opening 196 may be formed at previously un-tapped access nodes 14 on opposite sides of the valve 35. Thereafter, a flow line 134 may be coupled to each of the valves 116 so as to provide the desired fluid communication between the pipeline 12 and the newly added subsea equipment (not shown). The flow lines 134 provide a fluid circulation path (to and from) between the pipeline 12 and the newly added subsea equipment.

Accordingly, as will be appreciated by those skilled in the art after a complete reading of the present application, the provision of the un-tapped access nodes 14 in the pipeline 12 at the time the pipeline 12 is deployed into the sea provides engineers with much more flexibility as it relates to the development of the reservoir 10 and the positioning of subsea equipment above the reservoir 10 over the life of the reservoir. Additionally, in the embodiments where the utility lines 15 are strapped or coupled to the pipeline 12 at the time the overall pipeline system 11 is deployed into the sea, the use of some or all of traditional subsea umbilicals to provide various utilities, e.g., power, communication, chemicals, etc., may be eliminated.

The particular embodiments disclosed above are illustrative only, as the disclosed subject matter may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the claimed subject matter. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The invention claimed is:

1. A system, comprising:
a pipeline;
a plurality of future access node structures affixed to the pipeline prior to deployment of the pipeline subsea, said future access node structures being axially spaced apart from one another along the pipeline,
wherein each of the plurality of future access node structures comprises:
a body having a substantially planar upper surface;
an opening extending from the planar upper surface, through the body, to an interior of the pipeline; and
a pressure-barrier device positioned within the opening, entirely below the planar upper surface, wherein the pressure-barrier device is selected from a group consisting of a plug and a membrane, and wherein the pressure-barrier device sealingly engages an inner surface of the opening;
a support block positioned around the pipeline, wherein the support block comprises:
a strap recess formed within an upper surface of the support block; and
a slot extending through the support block and below the upper surface of the support block;
a utility line extending through the slot, wherein the utility line is coupled to the pipeline by the support block; and
a strap extending through the strap recess, partially covering the utility line, and wrapped around an outer diameter of the pipeline.

2. The system of claim 1, wherein the pressure-barrier device is a removable pressure-barrier device, and the plug comprises a mechanically set plug or a glass plug.

3. The system of claim 1, wherein the pressure-barrier device is a bursting pressure-retaining device, and the membrane is adapted to be ruptured upon being exposed to a rupture pressure.

4. The system of claim 1, wherein the plurality of future access node structures are axially spaced apart from one another by a uniform distance.

5. The system of claim 1, wherein the utility line comprises one of an electrical heating line, an electrical power line, an electrical communications line, a liquid supply line and a fiber optic communications line.

6. A system, comprising:

a pipeline; and a plurality of future access node structures affixed to the pipeline, said future access node structures being axially spaced apart from one another along the pipeline, wherein at least one of the plurality of future access node structures comprises:

a substantially planar upper surface; and a pressure-barrier retaining structure positioned below the upper surface that comprises a scored bottom, the scored bottom having at least one groove formed therein.

7. The system of claim 6, further comprising at least one utility line coupled to the pipeline by a strap.

8. The system of claim 7, wherein the at least one utility line comprises one of an electrical heating line, an electrical power line, an electrical communications line, a liquid supply line and a fiber optic communications line.

9. The system of claim 7, wherein the at least one utility line is positioned in a utilities support block and the utilities support block is coupled to the pipeline by a strap.

10. The system of claim 6, wherein the utility line is a liquid-carrying utility line, and the support block is a fluid tapping support block.

11. The system of claim 10, wherein the fluid tapping support block comprises a threaded opening that is positioned above a portion of the liquid-carrying utility line and wherein the system further comprises a tapping structure threadingly positioned within the threaded opening, the tapping structure having a fluid flow passageway defined therein that is in communication with a fluid outlet and a pointed end, the pointed end being adapted to engage and penetrate the liquid-carrying utility line.

12. The system of claim 10, wherein the fluid tapping support block comprises a push-fit hydraulic snap-in connector that is adapted to, when actuated, engage and penetrate the liquid-carrying utility line.

13. A method, comprising:

deploying a pipeline comprising a plurality of future access node structures affixed to the pipeline prior to deployment of the pipeline subsea, said future access node structures being axially spaced apart from one another along the pipeline, wherein at least one of the plurality of future access node structures comprises:

a substantially planar upper surface; and a pressure-barrier retaining structure comprised of a recess with a scored pressure-retaining bottom positioned below the substantially planar upper surface that, at the time the pipeline is deployed subsea, prevent fluid communication between sea water and an interior of the pipeline.

14. The method of claim 13, wherein the plurality of future access node structures is installed into at least one section of pipe at an on-shore facility.

15. The method of claim 13, wherein each of the plurality of future access node structures is installed in a section of pipe that is further attached to additional sections of pipe, wherein the act of attaching the section of pipe to the additional section of pipe occurs on-board a pipe-laying vessel.

16. The method of claim 13, further comprising, after the pipeline is deployed subsea, performing at least one process operation at one of the future access node structures to access the interior of the pipeline.

17. The method of claim 16, wherein performing the at least one process operation comprises performing a tapping operation to form a tapped opening in the pipeline at the location of the one of the future access node structures.

18. The method of claim 16, wherein performing the at least one process operation comprises removing a removable pressure-barrier device positioned within an opening in the pressure-barrier retaining structure at the location of the one of the future access node structures.

19. The method of claim 16, wherein the one of the future access node structures comprises a bursting pressure-retaining device that comprises a membrane that is capable of being ruptured, wherein performing the at least one process operation comprises exerting a pressure on the membrane sufficient to rupture the membrane so as to gain fluid access to the interior of the pipeline.

20. The method of claim 16, wherein the method further comprises performing the at least one process operation to mechanically remove at least a portion of the scored pressure-retaining bottom so as to gain fluid access to the interior of the pipeline.

* * * * *